United States Patent
Björnson et al.

(10) Patent No.: US 11,502,804 B2
(45) Date of Patent: Nov. 15, 2022

(54) METHODS AND APPARATUS FOR TRANSMITTING AND RECEIVING CONTROL CHANNEL INFORMATION

(71) Applicant: TELEFONAKTIEBOLAGET LM ERICSSON (PUBL), Stockholm (SE)

(72) Inventors: Emil Björnson, Hägersten (SE); Pål Frenger, Linköping (SE); Erik G. Larsson, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 275 days.

(21) Appl. No.: 16/756,208

(22) PCT Filed: Nov. 13, 2017

(86) PCT No.: PCT/SE2017/051122
§ 371 (c)(1),
(2) Date: Apr. 15, 2020

(87) PCT Pub. No.: WO2019/093935
PCT Pub. Date: May 16, 2019

(65) Prior Publication Data
US 2021/0194655 A1    Jun. 24, 2021

(51) Int. Cl.
*H04L 5/00* (2006.01)
*H04W 72/04* (2009.01)
(Continued)

(52) U.S. Cl.
CPC ......... *H04L 5/0053* (2013.01); *H04W 72/042* (2013.01); *H04B 7/0452* (2013.01)

(58) Field of Classification Search
CPC .... H04B 7/0617; H04B 7/068; H04B 7/0452; H04B 7/0691; H04B 7/0695; H04B 7/0682; H04L 5/0053
See application file for complete search history.

(56) References Cited

U.S. PATENT DOCUMENTS

| | | | | |
|---|---|---|---|---|
| 2010/0105635 A1* | 4/2010 | Miyazawa | ........... | A61K 31/661 514/77 |
| 2011/0143763 A1* | 6/2011 | Kim | .................. | H04W 72/1231 455/450 |

(Continued)

FOREIGN PATENT DOCUMENTS

| | | | | |
|---|---|---|---|---|
| CN | 3515107 | * | 9/2017 | ............ H04W 24/10 |
| WO | WO2011/032035 A2 | | 3/2011 | |
| WO | WO2013/153546 A1 | | 10/2013 | |

OTHER PUBLICATIONS

Garrammone, Giuliano, International Search Report, PCT/SE2017/051122, European Patent Office, P.B. 5818 Patentlaan 2, NL—2280 HV Rijswijk, dated Jul. 17, 2008.

*Primary Examiner* — Diane L Lo
*Assistant Examiner* — Abusayeed M Haque
(74) *Attorney, Agent, or Firm* — Ericsson Canada Inc.

(57) ABSTRACT

A method, in a base station, for transmitting first control channel information to a first wireless device and second control channel information to a second wireless device in a wireless communications network. The method comprises obtaining an indication of whether a spatial relationship between the first wireless device and the second wireless device meets a predetermined condition and operating in one of a first mode and a second mode based on the indication. Operating in the first mode comprises transmitting the first control channel information and the second control channel information using common radio resources; and operating in the second mode comprises transmitting the first control channel information to the first wireless device and the second control channel information to the second wireless device using orthogonal radio resources. Methods and apparatus for obtaining control channel information in a first wireless device are also disclosed.

26 Claims, 18 Drawing Sheets

(51) Int. Cl.
*H04B 7/06* (2006.01)
*H04B 7/0452* (2017.01)

(56) References Cited

U.S. PATENT DOCUMENTS

| | | |
|---|---|---|
| 2012/0087318 A1 | 4/2012 | Liu et al. |
| 2015/0179219 A1* | 6/2015 | Gao ............... G06F 3/0484 386/278 |
| 2017/0230845 A1* | 8/2017 | Pajona ............. H04W 24/02 |
| 2018/0049189 A1* | 2/2018 | Hugl .............. H04L 5/0051 |
| 2019/0053140 A1* | 2/2019 | Wong ............. H04L 67/12 |

* cited by examiner

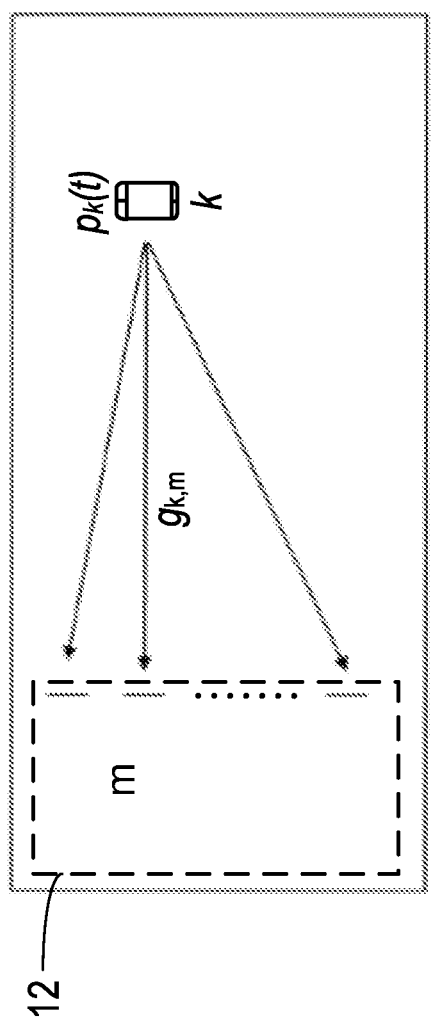
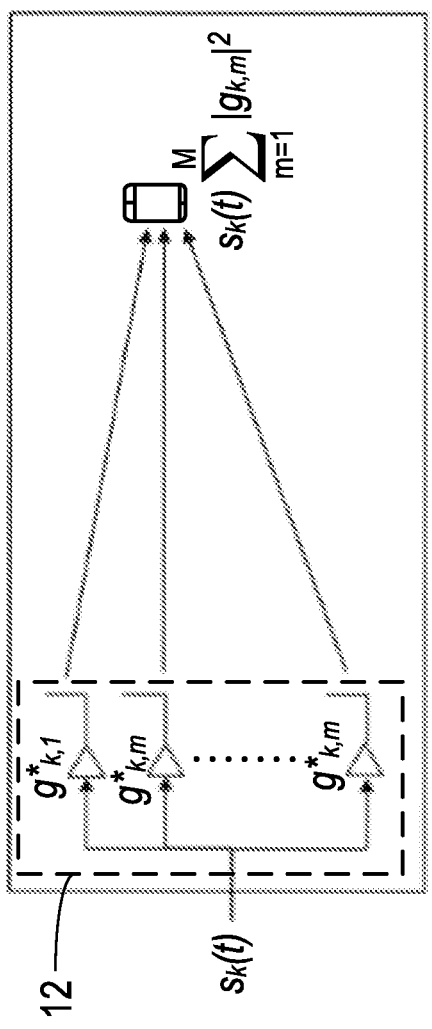

US 11,502,804 B2

METHODS AND APPARATUS FOR TRANSMITTING AND RECEIVING CONTROL CHANNEL INFORMATION

This application is a 35 U.S.C. § 371 national phase filing of International Application No. PCT/SE2017/051122, filed Nov. 13, 2017, the content of which is incorporated herein by reference in its entirety.

TECHNICAL FIELD

Embodiments described herein relate to methods and apparatus for transmitting and receiving control channel information. In particular, embodiments disclosed herein comprise obtaining a spatial relationship between a first wireless device and a second wireless device and controlling how control channel information is transmitted to the first wireless device and the second wireless device based on the spatial relationship.

BACKGROUND

Massive Multiple Input Multiple Output (MIMO) technology is a multi-user technology which may provide uniformly high quality of service to a plurality of wireless devices operating in high-mobility environments. Base stations may be provided with arrays of a large number of antennas, which may then be used to serve a plurality of wireless devices simultaneously by using spatial multiplexing.

The wireless devices may be informed about which radio resources have been allocated to them for the reception of payload data. This may be accomplished through the transmission of control channel information using a downlink control channel, for example, a Physical Downlink Control Channel (PDCCH). In order to obtain the control channel information, wireless devices may be configured to blindly search a predetermined search space of radio resources until the control channel information intended for the wireless device is found.

With existing solutions, the number of radio resources used for control channel information on a control channel, for example PDCCH, grows proportionally to the number of wireless devices being served by the base station. Hence, as the number of wireless devices increases, each wireless device may need to make a proportionally larger number of decoding attempts to find control channel information intended for that particular wireless device. This may result in excessive power consumption in wireless devices, particularly in circumstances where no control channel information is transmitted to the wireless device within a particular search space. Moreover, with the advent of new diverse 5G applications, for example applications for enhanced broadband access and/or for low-power communications, wireless devices may support different bandwidths and different numbers of decoding attempts per second.

SUMMARY

According to some embodiments there is provided a method, in a first wireless device, for obtaining first control channel information from a base station. The method comprises receiving an indication from the base station to operate in one of a first mode and a second mode; and operating in one of the first mode and the second mode based on the indication. In the first mode, the first wireless device is configured to attempt to decode one or more first predetermined search space entries in order to obtain the first control channel information, each first predetermined search space entry defining radio resources, wherein the first control channel information is to be transmitted on radio resources defined by one of the one or more first predetermined search space entries. In the second mode the first wireless device is configured to attempt to decode a plurality of second predetermined search space entries in order to obtain the first control channel information, each search space entry defining radio resources, and wherein the first control channel information is to be transmitted on radio resources defined by one of the plurality of second predetermined search space entries; wherein the number of first predetermined search space entries is less than the number of second predetermined search space entries.

According to some embodiments there is provided a method, in a base station, for transmitting first control channel information to a first wireless device and second control channel information to a second wireless device in a wireless communications network. The method comprises obtaining an indication of whether a spatial relationship between the first wireless device and the second wireless device meets a predetermined condition; and operating in one of a first mode and a second mode based on the indication. Operating in the first mode comprises transmitting the first control channel information and the second control channel information using common radio resources. Operating in the second mode comprises transmitting the first control channel information to the first wireless device and the second control channel information to the second wireless device using orthogonal radio resources.

According to some embodiments there is provided a communication system including a host computer comprising processing circuitry configured to provide user data; and a communication interface configured to forward the user data to a cellular network for transmission to a wireless device. The cellular network comprises a base station having a radio interface and processing circuitry, and the base station's processing circuitry is configured to perform any of the steps of as described in the method above.

According to some embodiments there is provided a first wireless device for obtaining control channel information from a base station. The first wireless device comprises an interface and processing circuitry configured to receive an indication from the base station to operate in one of a first mode and a second mode; and cause the first wireless device to operate in one of the first mode and the second mode based on the indication. In the first mode, the first wireless device is configured to attempt to decode one or more first predetermined search space entries in order to obtain the first control channel information, each search space entry defining radio resources, and wherein the first control channel information is to be transmitted on radio resources defined by one of the one or more first predetermined search space entries. In the second mode the first wireless device is configured to attempt to decode a plurality of second predetermined search space entries in order to obtain the first control channel information, each search space entry defining radio resources, and wherein the first control channel information is to be transmitted on radio resources defined by one of the plurality of second predetermined search space entries; wherein the number of first predetermined search space entries is less than the number of second predetermined search space entries.

According to some embodiments there is provided a communication system including a host computer comprising processing circuitry configured to provide user data; and a communication interface configured to forward user data to a cellular network for transmission to a wireless device. The wireless device comprises a radio interface and processing circuitry, and the wireless device's components are configured to perform any of the steps as described in the method above.

According to some embodiments there is provided a base station for transmitting first control channel information to a first wireless device and second control channel information to a second wireless device in a wireless communications network. The base station comprises an interface and processing circuitry configured to obtain an indication of whether a spatial relationship between the first wireless device and the second wireless device meets a predetermined condition; and cause the base station to operate in one of a first mode or a second mode based on the indication. In the first mode the base station is configured to transmit the first control channel information and the second control channel information using common radio resources. In the second mode the base station is configured to transmit first control channel information to the first wireless device and the second control channel information to the second wireless device using orthogonal radio resources.

According to some embodiments there is provided a computer program comprising instructions which, when executed on at least one processor, cause the at least one processor to carry out the method as described above.

According to some embodiments there is provided a computer program product comprising a computer-readable medium with the computer program as described above.

BRIEF DESCRIPTION OF THE DRAWINGS

For a better understanding of the present invention, and to show how it may be put into effect, reference will now be made, by way of example only, to the accompanying drawings, in which:—

FIGS. 3a and 3b illustrate an example of reciprocity based beamforming;

DETAILED DESCRIPTION

Figure 1:
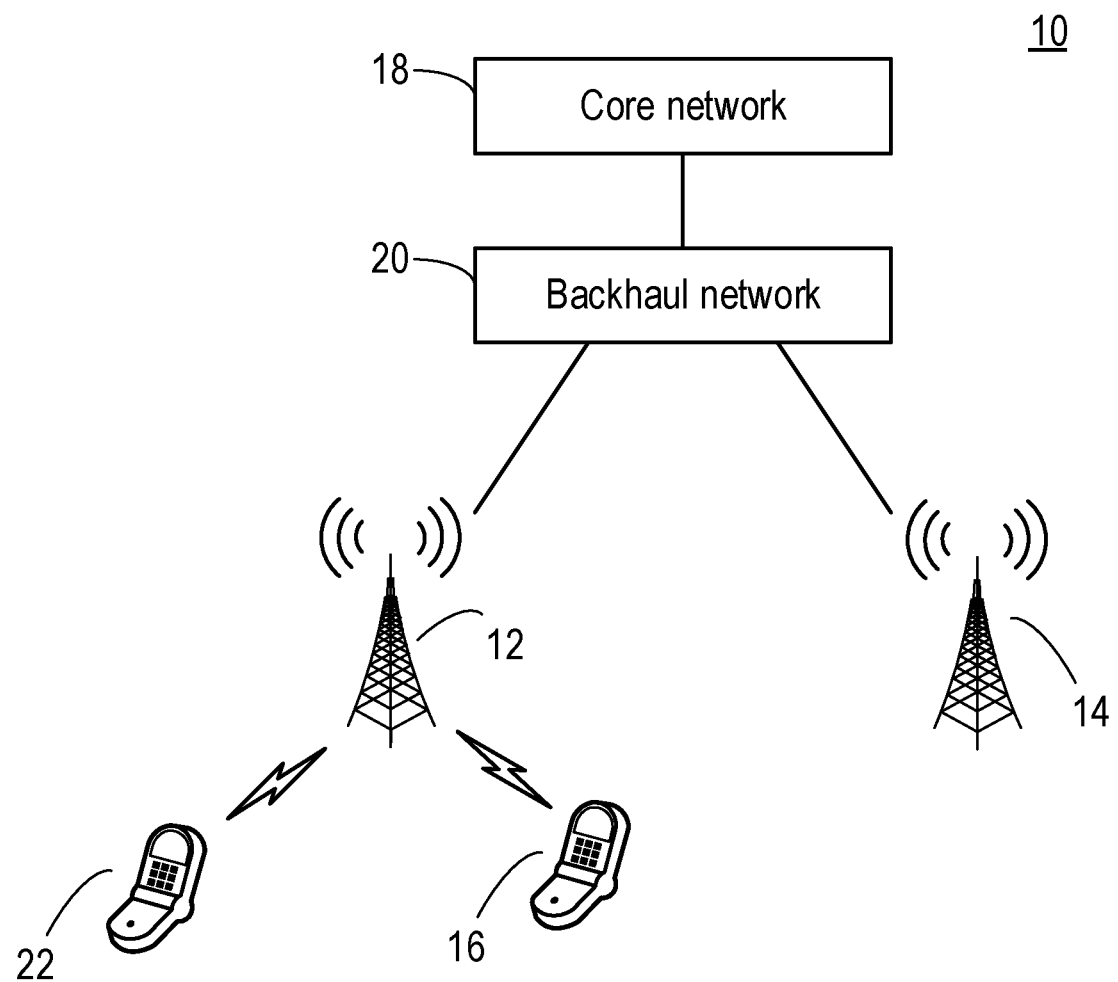
FIG. 1 illustrates a wireless communications network.

The following sets forth specific details, such as particular embodiments for purposes of explanation and not limitation. But it will be appreciated by one skilled in the art that other embodiments may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general-purpose computers that are specially adapted to carry out the processing disclosed herein, based on the execution of such programs. Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors, one or more processing modules or one or more controllers, and the terms computer, processor, processing module and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Although the description is given for a wireless device, or user equipment (UE), it should be understood by the skilled in the art that "UE" is a non-limiting term comprising any mobile or wireless terminal, device or node equipped with a radio interface allowing for at least one of: transmitting signals in uplink (UL) and receiving and/or measuring signals in downlink (DL). A UE herein may comprise a UE (in its general sense) capable of operating or at least performing measurements in one or more frequencies, carrier frequencies, component carriers or frequency bands. It may be a "UE" operating in single- or multi-radio access technology (RAT) or multi-standard mode.

The description involves communication between a UE and a radio access network, which typically includes multiple radio access nodes. In the specific example given, the radio access nodes take the form of eNodeBs (eNBs), as defined by 3GPP, or gNodeBs (gNBs) as utilised in the future standards expected to meet the 5G requirements. However, it will be appreciated that the concepts described herein may involve any radio access nodes. Moreover, where the following description refers to steps taken in or by a radio access node, this also includes the possibility that some or all of the processing and/or decision-making steps may be performed in a device that is physically separate from the radio antenna of the radio access node, but is logically connected thereto. Thus, where processing and/or decision making is carried out "in the cloud", the relevant processing device is considered to be part of the radio access node for these purposes.

Embodiments disclosed herein relate to the transmission and reception of control channel information. In particular, the embodiments disclosed herein are concerned with the use of spatial multiplexing to transmit control channel information to wireless devices.

FIG. 1 illustrates a wireless communications network 10 that may be utilized to explain the principles of embodiments of the present disclosure. The network 10 comprises first and second base stations 12, 14 which are connected, via a backhaul network 20, to a core network 18.

The base stations 12, 14 may be referred to as e.g. radio access nodes, NodeBs, evolved NodeBs (eNB, or eNodeB), gNodeBs, base transceiver stations, Access Point Base Stations, base station routers, Radio Base Stations (RBSs), macro base stations, micro base stations, pico base stations, femto base stations, Home eNodeBs, relays and/or repeaters, beacon devices or any other network node configured for communication with wireless devices over a wireless interface, depending e.g. on the radio access technology and terminology used.

A first wireless device 16 (also referred to as a wireless terminal, or UE) is in wireless communication with the base station 12. For example, the first wireless device 16 may be camped on a cell or beam which the base station 12 serves. Messages transmitted by the first wireless device 16 to the base station 12 are said to be transmitted in the "uplink", while messages transmitted by the base station 12 to the first wireless device 16 are said to be transmitted in the "downlink".

Also shown in FIG. 1 is a second wireless device 22. The second wireless device 22 is also in communication with the base station 12. In some examples, the base station 12 is provided with an array of antennas configured to use massive MIMO technology. For example, the first wireless device 16 and the second wireless device 22 may be served using common radio resources by applying spatial multiplexing techniques, such as beamforming, at the base station 12.

Wireless devices 16, 22 and base stations 12, 14 according to embodiments disclosed herein may be operable in at least two modes. In a first mode of operation, the base station 12 may be configured to transmit control channel information to a first wireless device 16 and a second wireless device 22 using common radio resources. It will be appreciated that the base station may transmit control channel information using common radio resources to any number of wireless devices. Each wireless device 16, 22 is configured, when operating in a first mode, to attempt to decode one or more first predetermined search space entries in order to obtain the first control channel information, each first predetermined search space entry defining radio resources, wherein the first control channel information is to be transmitted on radio resources defined by one of the one or more first predetermined search space entries. For example, in this first mode, the control channel information for a first wireless device and a second wireless device may be transmitted over common radio resources using spatial multiplexing.

In some examples, each wireless device may be configured to decode predefined radio resources, i.e. there may be only one first predetermined search space entry, to obtain the control channel information. In other words, in some embodiments, a wireless device may be aware of which radio resources will be used to transmit the control channel information.

In some embodiments, the wireless device may be configured to, in the first mode, attempt to decode the one or more first predetermined search space entries by initially attempting to decode a predefined one of the one or more first predetermined search space entries. In other words, the control channel information may be transmitted on the predefined one of the one or more first predetermined search space entries, but as the size of the control channel information is unknown, one or more subsequent search space entries may also be used.

In these embodiments, the wireless device may cease attempting to decode the first predetermined search space entries when one search space entry is found not to contain any control channel information.

However, in circumstances where wireless devices 16, 22 are close together, the control channel information transmitted to the wireless devices 16, 22 may interfere. Given that this interference may obstruct the decoding of the control channel information, this can lead to unsuccessful retrieval of the control channel information, which may lead to unsuccessful subsequent decoding of any payload data transmissions.

The wireless devices 16, 22 and base station 12 may therefore operate in a second mode of operation. In the second mode, the base station 12 is configured to transmit control channel information to a first wireless device 16 and a second wireless device 22 on orthogonal radio resources. It will be appreciated that the base station may transmit control channel information on orthogonal radio resources to any number of wireless devices. In the second mode, each of the first wireless device 16 and second wireless device 22 is configured to attempt to decode a plurality of second predetermined search space entries in order to obtain the control channel information. Each second predetermined search space entry defines radio resources, wherein the control channel information is to be transmitted on radio resources defined by one of the plurality of second predetermined search space entries. The number of first predetermined search space entries used in the first mode is less that the number of second predetermined search space entries used in the second mode.

In other words, the second mode may require more power to be consumed by the wireless device as the number of search space entries which may need to be searched is higher.

However, when the base station is operating in the second mode, the first wireless device 16 and the second wireless device 22 may be required to blindly search for the control channel information and, particularly in circumstances where no control channel information is actually transmitted to either wireless device within a particular search space, this may result in excessive power consumption within said wireless device. However, blind searching may reduce the signalling required, as the wireless device 16, 22 need not be specifically told each time the radio resources to be used for control channel information are changed, which in high mobility environments may be frequently.

Embodiments disclosed herein may therefore balance the requirements for low interference between control channel information transmissions, against the power consumption of the wireless devices.

Figure 2:
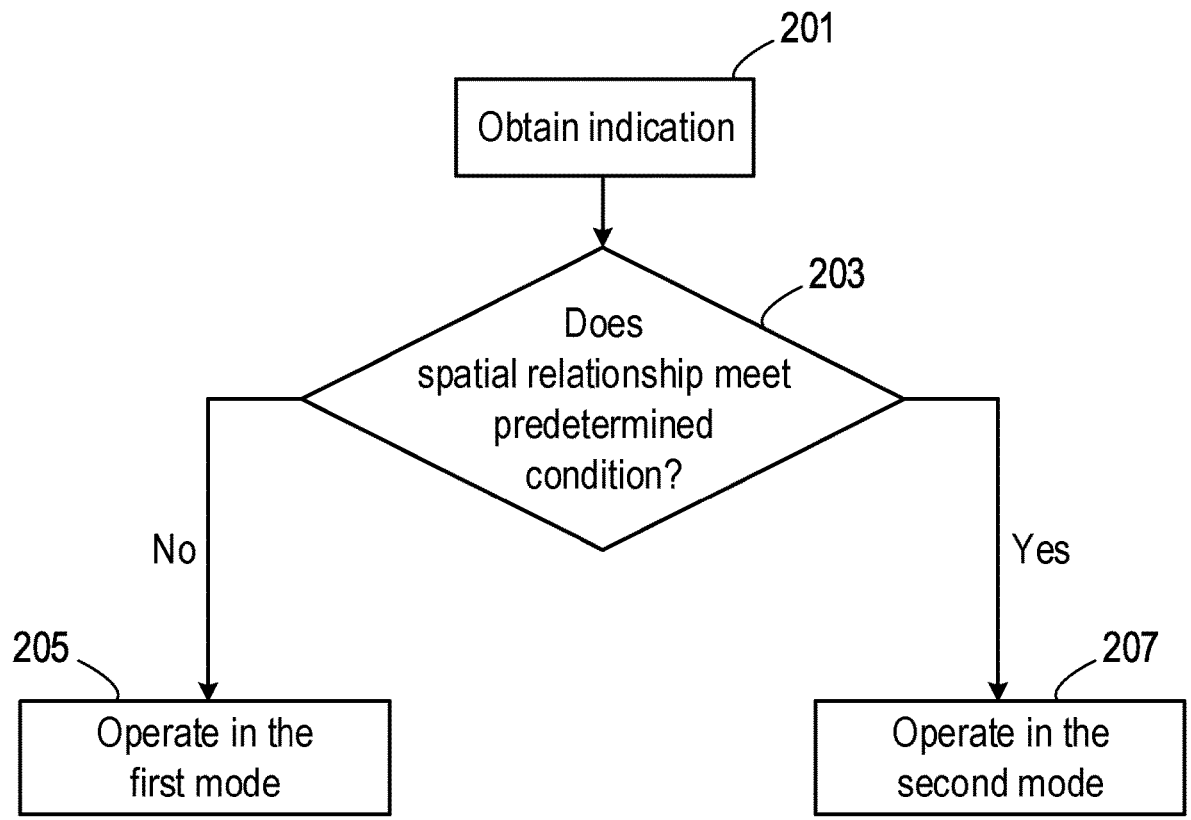
FIG. 2 illustrates a method performed in a base station according to some embodiments.

FIG. 2 illustrates a method performed in a base station (for example base station 12 of FIG. 1) for transmitting first control channel information to a first wireless device (for example first wireless device 16 of FIG. 1) and second control channel information to a second wireless device (for example second wireless device 22 of FIG. 1) in a wireless communications network. In step 201, the base station obtains an indication, and, in step 203 determines whether a spatial relationship between the first wireless device and the second wireless device meets a predetermined condition. If the spatial relationship does not meet the predetermined condition, the method passes to step 205 in which the base station operates in a first mode. If the spatial relationship does meet the predetermined condition, the method passes to step 207 in which the base station operates in a second mode.

The term spatial relationship is used herein to define an indication of the relative locations of the first wireless device and the second wireless device. If wireless devices that are close together receive signals which are transmitted using spatial multiplexing over the same radio resources, the likelihood that those signals will interfere may be much greater than if the wireless devices are well separated. In some examples, therefore, the spatial relationship may be an indication of a likelihood of interference between signals transmitted to the first wireless device and the second wireless device using common radio resources. For example, if the spatial relationship meets the predetermined condition, this may be indicative of a high likelihood of interference between the first wireless device and the second wireless device. The base station will then operate in one of a first mode or a second mode based on the obtained indication.

For example, the spatial relationship between a first wireless device and a second wireless device may comprise a physical separation between the first wireless device and the second wireless device. In some examples, the physical separation comprises an angular separation between the first wireless device and the second wireless device with reference to the serving base station.

In some embodiments, the spatial relationship may comprise a distance between the first wireless device and the second wireless device. For example, the base station may calculate the distance between the first wireless device and the second wireless device by performing propagation delay calculations based on signals transmitted between the first wireless device and the base station, and based on signals transmitted between the second wireless device and the base station.

In some embodiments, in addition to a distance between the first wireless device and the second wireless device, an angle-of-arrival (AoA) of uplink signals from said first and second wireless devices may be used to determine a spatial relationship. For example, by combining an estimated distance and an estimated AoA for both said first and second wireless devices, the estimation of the distance between the first wireless device and second wireless device may be enhanced.

In some examples, the predetermined condition comprises a condition that compares the physical separation between the first wireless device and the second wireless device to a threshold value. For example, the predetermined condition may be considered to be met when the physical separation between the first wireless device and the second wireless device is less than the threshold value, as this may be indicative of the first wireless device and the second wireless device being close together, and therefore being likely to interfere with each other.

In some embodiments, the predetermined condition comprises a condition that compares the physical separation between the first wireless device and the second wireless device to a first threshold value or a second threshold value. For example, when the first wireless device and second wireless device are moving towards one another the predetermined condition may be determined to be met when the physical separation is less that a first threshold value. However, when the first wireless device and the second wireless device are moving away from one another, the predetermined condition may be determined to not be met when the physical separation is greater than a second threshold value. In some examples, the second threshold value may be greater than the first threshold value. For example, the predetermined condition comprises a condition that compares the physical separation to a first threshold when the physical separation is decreasing, and a condition that compares the physical separation to a second threshold when the physical separation is increasing.

In some embodiments, the spatial relationship may comprise a relationship between the channel vectors associated with a first wireless channel between the first wireless device and the base station, and channel vectors associated with a second wireless channel between the second wireless device and the base station.

For example, the base station may monitor long-term statistics of the wireless channels. This may, for example, be performed through estimation of the second-order statistics of the wireless channels (covariance matrices) or angles-of-arrival of the main scattering clusters.

Channel vectors in massive MIMO technology may be determined using uplink pilot transmissions, with no consideration of any downlink pilot transmissions, as the channels in the uplink and downlink directions may be reciprocal.

FIG. 3a illustrates an example of reciprocity based beamforming. In FIG. 3a a base station 12 is provided with M antenna elements in an array. The M antenna elements are configured to be used to provide spatial multiplexing of transmissions using beamforming. The base station 12 may be configured to obtain channel state information, $g_{k,m}$ for each channel between each of the antenna elements, m, and each wireless device, k, served by the base station 12. To obtain the channel state information, the base station 12 may measure an uplink pilot transmission from each wireless device, k. As previously mentioned, in this example, as the channels in the uplink and downlink directions are reciprocal, the estimate of the uplink channel may be applied to the downlink channel.

For example, as shown in FIG. 3b, coherent beamforming may be provided by convolving the desired signal, $s_k(t)$ components transmitted from each antenna (as defined by a beamforming matrix) with the complex conjugate, of the channel estimate for that particular channel. This results in a coherent signal of $$s_k(t) \sum_{m=1}^{M} |g_{k \cdot m}|^2$$

being received by the wireless device, k. It will be appreciated that other methods for calculating transmitter beamforming weights may also be used.

Due to channel hardening, where, as the number of base station antennas increase, and the number of single-antenna wireless devices communicating with the base stations increases, the correlation matrix becomes increasingly a diagonal matrix, the wireless device 102 receives a signal with a known reference phase and amplitude. Therefore, in circumstances where the channel hardening is sufficient, there may be no need to introduce downlink pilots for downlink channel estimation.

As in some embodiments only uplink pilots are used to provide channel estimation, massive MIMO may be scalable with respect to the number of base station antennas.

It will be appreciated that in some embodiments downlink pilots may be used alternatively, or in addition to, the uplink pilots.

The base stations configured for MIMO technology may therefore operate autonomously, with no requirement for sharing of payload data or channel state information with other base stations.

However, when two wireless devices are close together, the eignespaces describing the wireless channels between the base station and each of the wireless devices may be similar. For example, the inner product between the channel vectors of the eigenspace for a first wireless channel and the channel vectors of the eigenspace for a second wireless channel may be high. If in these circumstances the control channel information is transmitted over the first and second wireless channels using spatial multiplexing, this may result in significant interference between the different control channel information transmitted to each of the wireless devices, even if spatial multiplexing is performed alongside signal processing that actively strives to suppress interference (for example zero-forcing, minimum mean squared error (MMSE) or similar). The overlap between the eigenspaces of a first wireless channel and a second wireless channel may therefore define a spatial relationship between the first wireless device and the second wireless device.

An overlap between the eigenspaces of the first wireless channel and the second wireless channel may therefore indicate a high likelihood of interference between signals transmitted to the first wireless device and the second wireless device using common radio resources. Therefore, in some examples, the predetermined condition comprises a condition that compares the eigenspace describing the first wireless channel with the eigenspace describing the second wireless channel.

For example, the predetermined condition may comprise a condition that the eigenspace describing the first wireless channel at least partially overlaps with the eigenspace describing the second wireless channel.

As described previously, in some examples of massive MIMO with channel hardening, the first wireless device and the second wireless device may not need to have any downlink reference symbols for demodulation of their downlink control channels. If they both use wireless device specific and orthogonal pilots in the uplink for performing uplink channel estimation, then any use of additional downlink pilots for demodulation may be primarily an implementation optimization. Even though downlink pilots may not needed in case of massive MIMO, a practical system (such as 3GPP New Radio or Long Term Evolution (LTE)) may make use of downlink pilots for some other reason.

Embodiments described herein would function regardless of whether or not downlink pilots signals are implemented. Even for the case when downlink pilots are used to demodulate the downlink control channels, for example where the first wireless device and the second wireless device use the same (possibly cell-specific) downlink pilot transmission. In circumstances where the channels to the first wireless device and second wireless device are spatially separated then the downlink pilot transmissions are unlikely to interfere. In circumstances where the eigenspaces describing the channels to the first wireless device and second wireless device overlap, then the base station may detect that the spatial relationship meets the predetermined condition and may ensure that the control channel information for the first wireless device and the second wireless device is transmitted on orthogonal radio resources. This allows each wireless device to perform downlink channel estimation and demodulation in the same manner, regardless of whether the control channel information is transmitted on orthogonal resources or is transmitted using spatial multiplexing.

Returning to FIG. 2, in step 203 the base station determines whether the spatial relationship meets the predetermined condition.

In other words, the base station determines whether the spatial relationship indicates that signals transmitted to the first wireless device and the second wireless device on common radio resources are likely to interfere.

If the spatial relationship does not meet the predetermined condition, the method passes to step 205 in which the base station operates in a first mode. As the predetermined condition, indicative of a high likelihood of interference between the first wireless device and the second wireless device, has not been met, the base station may therefore select a mode of operation which decreases power consumption in the wireless devices as there is a low chance of interference occurring between the first control channel information and the second control channel information. In some examples therefore, the first mode comprises: transmitting the first control channel information and the second control channel information using common radio resources.

It will be appreciated that the first control channel information and second control channel information may be transmitted with some common radio resources, and some orthogonal radio resources, particularly where the size of a control channel message to be transmitted to the first and second wireless devices varies.

If the spatial relationship does meet the predetermined condition, the method passes to step 207 in which the base station operates in a second mode. In other words, as the spatial relationship indicates that there is a high likelihood of interference between the signals transmitted to the first wireless device and the second wireless device on common radio resources, the base station selects a mode of operation which avoids such interference.

As described earlier, the second mode may comprise transmitting the first control channel information to the first wireless device and the second control channel information to the second wireless device using orthogonal radio resources. For example the first control channel information may be transmitted to the first wireless device on orthogonal radio resources to the radio resources used to transmit the second control channel information to the second wireless device.

As the spatial relationship between the first wireless device and the second wireless device is indicative of a high likelihood of interference between the first wireless device and the second wireless device, the base station selects a mode of operation in which the control channel information may be transmitted to the first wireless device and the second wireless device on orthogonal radio resources, thereby reducing interference between the first control channel information and the second control channel information.

The method may further comprise transmitting an indication to the first wireless device and the second wireless device of which of the first mode and the second mode the base station is operating in. This allows each wireless device to determine whether to search a one or more first search space entries for the control channel information, or to search a plurality of second search space entries for the control channel information. In other words, this allows each wireless device to determine whether to operate in a first mode or a second mode.

However, in some embodiments the base station does not alert the wireless devices of which mode is being used. In such embodiments, each wireless device may be configured to operate in only one mode of operation. In other words, the wireless device may be configured to always operate in a second mode of operation in which the wireless device is configured to attempt to decode a plurality of second predetermined search space entries in order to obtain the first control channel information, each search space entry defining radio resources, and wherein the first control channel information is to be transmitted on radio resources defined by one of the plurality of second predetermined search space entries.

In some examples, the second mode of operation may comprise encoding the first control channel information using a first channel code associated with the first wireless device. For example, the first channel code may comprise an identification code of the first wireless device. Equivalently, the second mode of operation may comprise encoding the second control channel information using a second channel code associated with the second wireless device. For example, the second channel code may comprise an identification code of the second wireless device.

The second mode of operation may also comprise transmitting a cyclic redundancy check (CRC) bit with the first and/or second control channel information. The CRC bit allows the first and/or second wireless device to determine whether it has correctly decoded the correct control channel information. In other words, the first and/or second wireless device may attempt to decode each search space entry until a positive result from the CRC is returned.

In some embodiments, in the second mode of operation the base station may apply non-orthogonal multiple access (NOMA) and inform, for example, the first wireless that it should expect payload data that comprises a superposition of data intended for the first wireless device as well as data for the second wireless device. In these embodiments, the base station may transmit first payload data to the first wireless device and second payload data to the second wireless device using common radio resources.

The first wireless device may then decode both the first payload data and the second payload data intended for the second wireless device using an algorithm such as successive interference cancellation.

To perform the successive interference cancellation, the first wireless device may also decode the second control channel information associated with the second wireless device. Since the first control channel information and the second control channel information have been transmitted on orthogonal radio resources, this may occur substantially free of interference.

In order to allow the first wireless device to decode the second control channel information, the base station, when operating in the second mode, may transmit to the first wireless device an indication of a second channel code for use in decoding the second control channel information. The second channel code may be associated with the second wireless device.

In some embodiments the method further comprises transmitting the payload data to the first wireless device and the second wireless device using orthogonal resources. For example, the method may comprise, when operating in the second mode, indicating in the first control channel information, first radio resources which will be used to transmit payload data to the first wireless device, and indicating in the second control channel information, second radio resources which will be used to transmit payload data to the second wireless device, wherein the second radio resources are orthogonal to the first radio resources.

Figure 4:
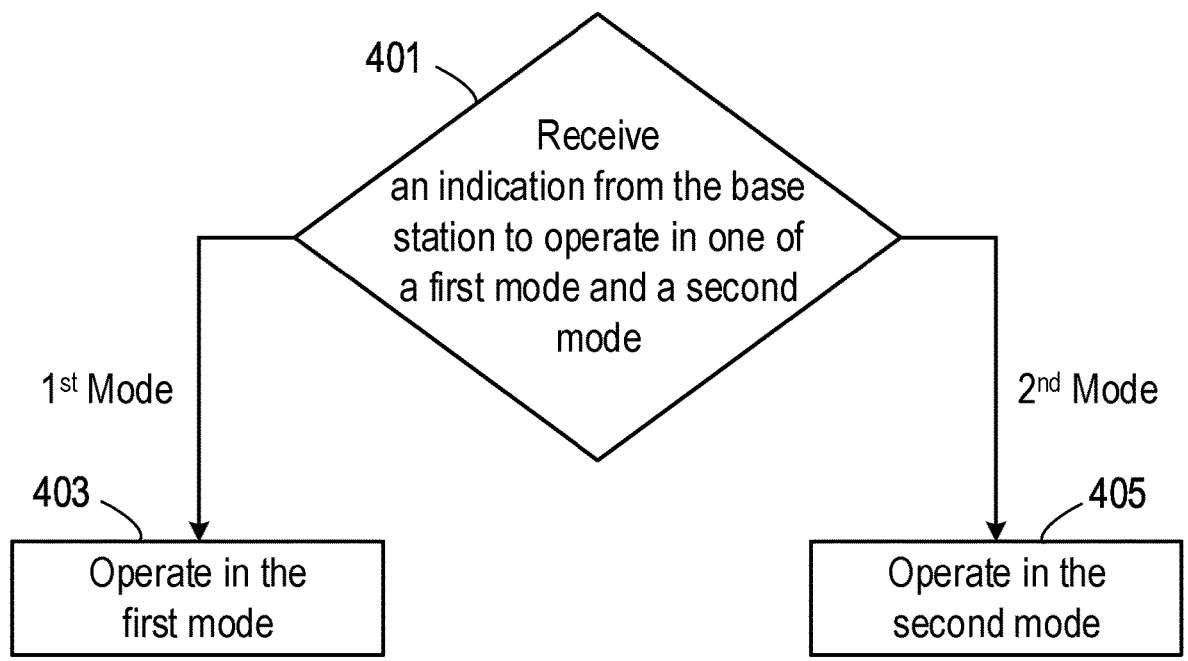
FIG. 4 illustrates a method in a first wireless device according to some embodiments.

FIG. 4 illustrates a method in a first wireless device for obtaining control channel information from a base station.

In step 401, the first wireless device receives an indication from the base station to operate in one of a first mode and a second mode. As described with reference to FIG. 2, the indication may be based on whether a spatial relationship between the first wireless device and a second wireless device served by the base station, meets a predetermined condition. In some embodiments, the indication comprises an indication of whether the base station is operating in the first mode or the second mode as described above with reference to FIG. 2.

If the indication is to operate in a first mode, the method passes to step 403 in which the first wireless device operates in the first mode. In the first mode, the first wireless device is configured to attempt to decode one or more first predetermined search space entries in order to obtain the first control channel information, each first predetermined search space entry defining radio resources, and wherein the first control channel information is to be transmitted on radio resources defined by one of the one or more first predetermined search space entries. The one or more first predetermined search space entries may be defined, for example, by some signalling from the base station indicating which resources are the one or more predetermined search space entries, or the one or more predetermined search space entries may be preconfigured in the first wireless device.

In some embodiments, the one or more first predetermined search space entries may comprise a first starting position in the control channel resource set time-frequency grid. In other words, the first starting position may be predefined, and may be signalled to the wireless device by the base station. The wireless device may then attempt to decode the one or more search space entries, starting at the first starting position.

For example, in the first mode, the first wireless device may be configured to attempt to decode the one or more first predetermined search space entries by initially attempting to decode a predefined one of the one or more first predetermined search space entries.

In some examples therefore, the base station may be configured to transmit control channel information to a wireless device which is operating in a first mode by transmitting the control channel information starting with the predefined one of the one or more first predetermined search space entries.

If the indication is to operate in a second mode, the method passes to step 405 in which the first wireless device operates in the second mode. In the second mode, the first wireless device is configured to attempt to decode a plurality of second predetermined search space entries in order to obtain the first control channel information, each search space entry defining radio resources, and wherein the first control channel information is to be transmitted on radio resources defined by one of the plurality of second predetermined search space entries. The number of first predetermined search space entries is less than the number of predetermined second search space entries.

In the second mode, the wireless device may not be configured with any particular starting point in the control channel resource set time-frequency grid, or in some examples, the wireless device may be configured with a plurality of possible starting points in the control channel resource set time-frequency grid.

In some embodiments, the method comprises receiving in the first control channel information an indication of radio resources which will be used to transmit payload data to the first wireless device. The first wireless devices may therefore decode the radio resources indicated in the first control channel information to receive the payload data.

In some embodiments, the first wireless device may be configured to decode second control channel information which is intended for a second wireless device. For example, the first wireless device may decode the second control channel information in order to perform successive interference cancellation on any received payload data which may be subject to interference with payload data transmitted to the second wireless device.

For example, in the second mode the first wireless device may be configured to receive an indication of a channel code for use in decoding second control channel information to be transmitted to the second wireless device. The first wireless device may be configured to attempt to decode a plurality of third predetermined search space entries using the channel code in order to obtain the second control channel information, each search space entry defining radio resources, and wherein the second control channel information is to be transmitted on radio resources defined by one of the plurality of third predetermined search space entries. The radio resources defined by the third predetermined search space entries may be orthogonal to the radio resources defined by the second predetermined search space entries.

In some embodiments, the first wireless device utilises the second control channel information to perform successive interference cancellation to suppress interference caused by payload data transmitted to the second wireless device.

Figure 5:
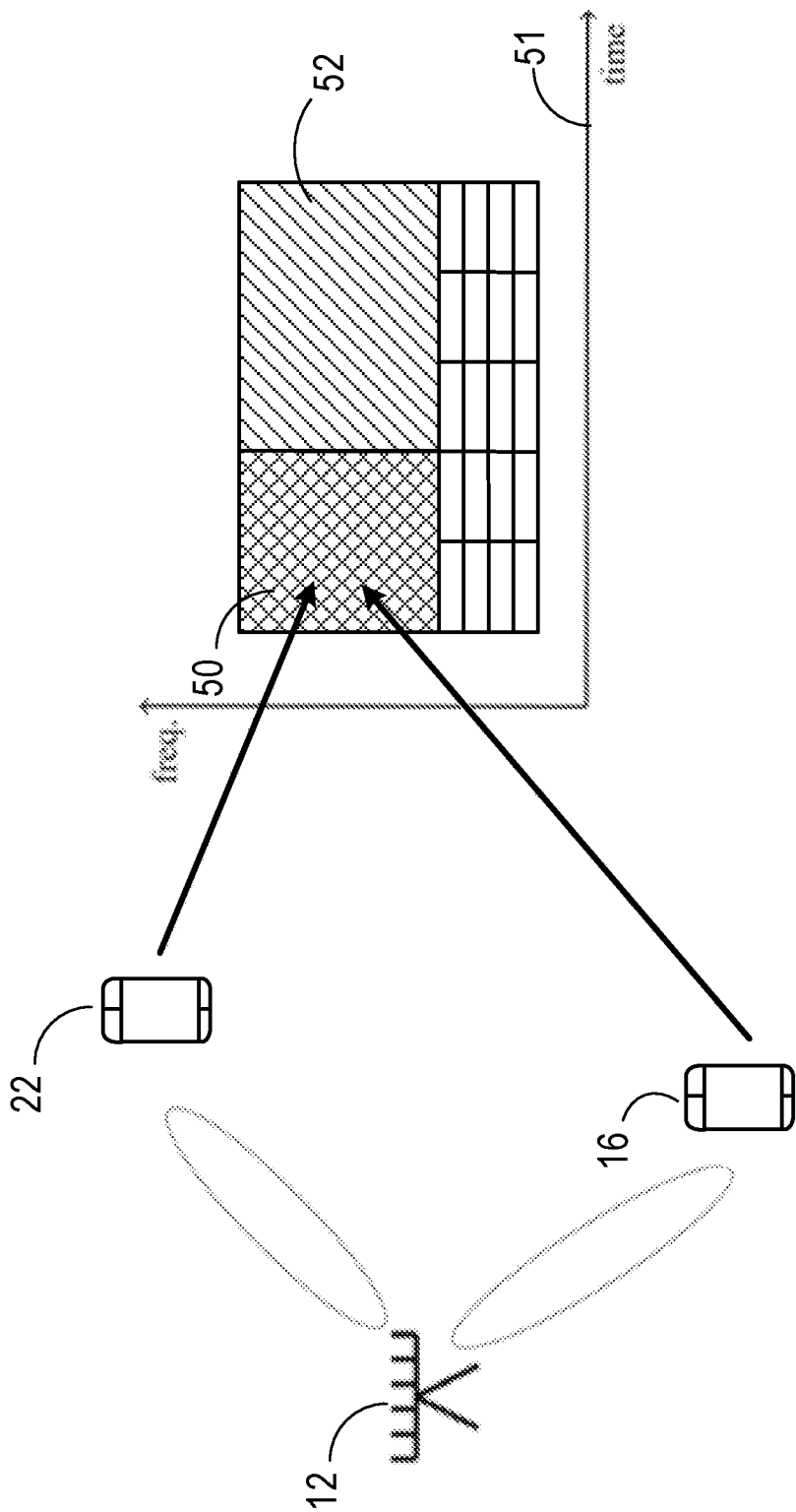
FIG. 5 illustrates an example of two wireless devices communicating with a base station according to some embodiments.

FIG. 5 illustrates two wireless devices 16, 22 communicating with a base station 12. In this example, the wireless devices are well separated. In other words, the spatial relationship between the first wireless device 16 and the second wireless device 22 is not indicative of a high likelihood of interference between signals transmitted between the first wireless device 16 and the second wireless device 22 on common radio resources.

The control channel information may therefore be transmitted to the first wireless device 16 and the second wireless device 22 using common radio resources 50 indicated in the time frequency graph 51. In this example, first control channel information for the first wireless device 16 is transmitted with the second control channel information for the second wireless device 22 on the same radio resources 50 using spatial multiplexing.

First payload data is, in this example, transmitted to the first wireless device 16 using the radio resources 52. Second payload data is also transmitted to the second wireless device 22 using the radio resources 52. Again spatial multiplexing may be used to transmit the first and second payload data using the first set of radio resources 52. The first control channel information and second control channel information may indicate which radio resources will be used as the first set of resources 52 for the transmission of payload data.

Figure 6:
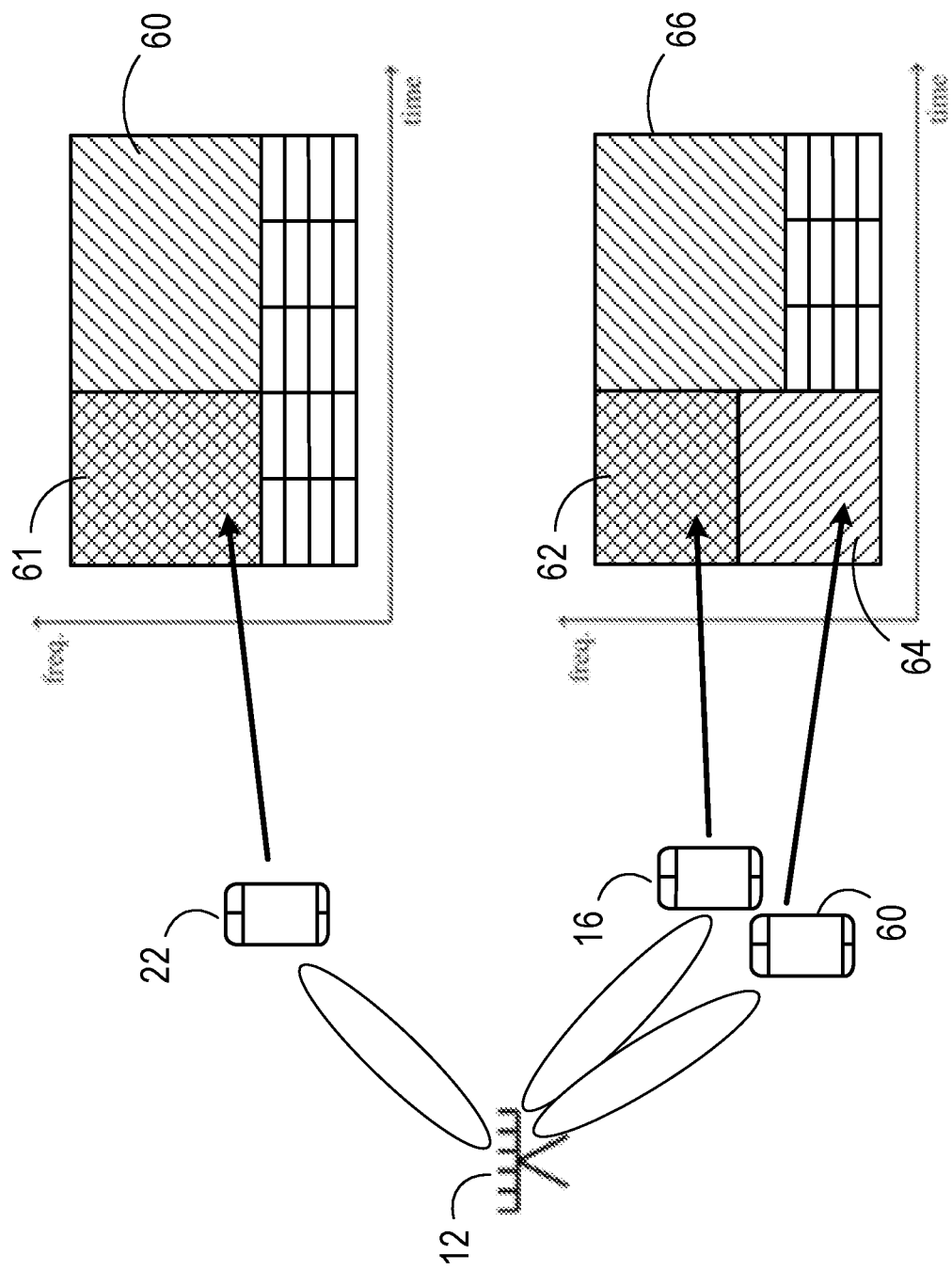
FIG. 6 illustrates an example of three wireless devices communicating with a base station according to some embodiments.

FIG. 6 illustrates three wireless devices 16, 22 and 60 communicating with a base station 12. In this example, the first wireless device 16 and the second wireless device 22 are still well separated. In other words, common radio resources may still be used by the base station to transmit control channel information to the wireless devices 16 and 22. In this particular example, a second set of radio resources 62 is used to transmit the first control channel information to the first wireless device 16. The second set of radio resources 62, in this example partially overlaps with the first set of radio resources 61. There are therefore some common radio resources used to transmit both the first control channel information and the second control channel information. It will be appreciated, that in some embodiments the first set of radio resources 61 and the second set of radio resources 62 may be identical.

In this example, a third wireless device 60 approaches the first wireless device 16. Therefore, the spatial relationship between the first wireless device 16 and the third wireless device 60 may become indicative of a high likelihood of interference between signals transmitted to the first wireless device 16 and the third wireless device 60 using common radio resources.

In this example, therefore, the base station 12 may determine that it is necessary for communications with the first wireless device 16 and third wireless device 60 to enter the second mode of operation. This may be indicated to the first wireless device 16 and the third wireless device 60. As the first wireless device 16 and third wireless device 60 are approaching one another, the control channel information for the third wireless device is transmitted by the base station 12 to the third wireless device 60 on a third set of radio resources 64 which are orthogonal to the radio resources 62 used to transmit control channel information to the first wireless device 16.

The first wireless device 16 and the third wireless device 60 may be alerted of the change in operation of the base station 12, and may therefore commence blind searching for the second set of radio resources 62 and the third set of radio resources 64 respectively.

In some embodiments, common control channel information, intended for both the first wireless device and the third wireless device, may be transmitted on common radio resources. In other words, the first set of radio resources and third set of radio resources may overlap, and the radio resources common to both the first set and the second set may be used only for the transmission of common control channel information.

In this example, it will be appreciated that payload data may be transmitted to the wireless devices using common radio resources. In this example, payload radio resources 66 are used to transmit the payload data using spatial multiplexing.

As the first wireless device 16 and third wireless device 60 may therefore experience some interference between their respective payload data, each wireless device may be configured to decode the control channel information associated with the respective other of the first and third wireless devices. The first wireless device 16 and third wireless device 60 may then use the control channel information associated with the respective other of the first and third wireless device to perform successive interference cancellation to suppress interference in the payload data.

It will also be appreciated that the payload data may be transmitted to the first wireless device and third wireless device using orthogonal radio resources.

Figure 7:
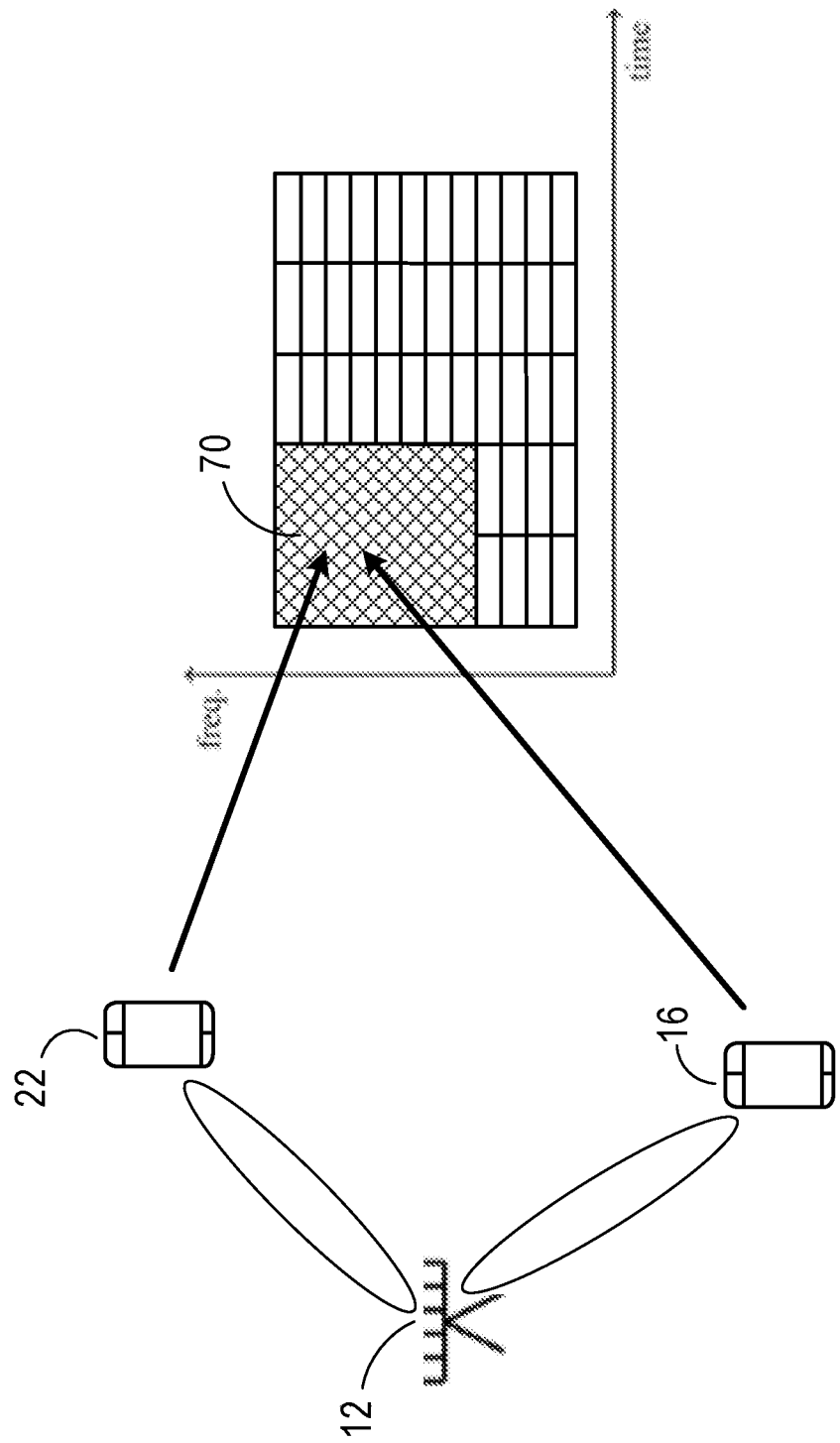
FIG. 7 illustrates an embodiment where the control channel is divided into subsets of radio resources.

FIG. 7 illustrates an embodiment where the control channel is divided into subsets of radio resources.

In this example, wireless devices are allocated to a subset, for example a first subset, wherein control channel information is transmitted to wireless devices in the same subset using the same radio resources, and control channel information is transmitted to wireless devices in different subsets using orthogonal radio resources. It will be appreciated that there may be more than two wireless devices within any particular subset.

In this example, the base station 12 assigns the first wireless device 16 and the second wireless device 22 to the same subset as they have a spatial relationship which is not indicative of a high likelihood of interference. In this example, the radio resources 70 are used to transmit control channel information to wireless devices in the first subset. In some examples, if the volume of control channel information to be transmitted to wireless devices within a subset is small, the control channel information may be transmitted to different wireless devices on orthogonal radio resources within the radio resources 70.

When two wireless devices, that have been assigned the same subset begin approaching one another, the base station 12 may determine that the wireless devices are no longer spatially separable. One of the wireless devices may then be assigned to a different subset and the base station 12 may send a control signal to inform each wireless device of this decision. This corresponds to redefining the control region set (CORESET) for at least one of the users.

Figure 8:
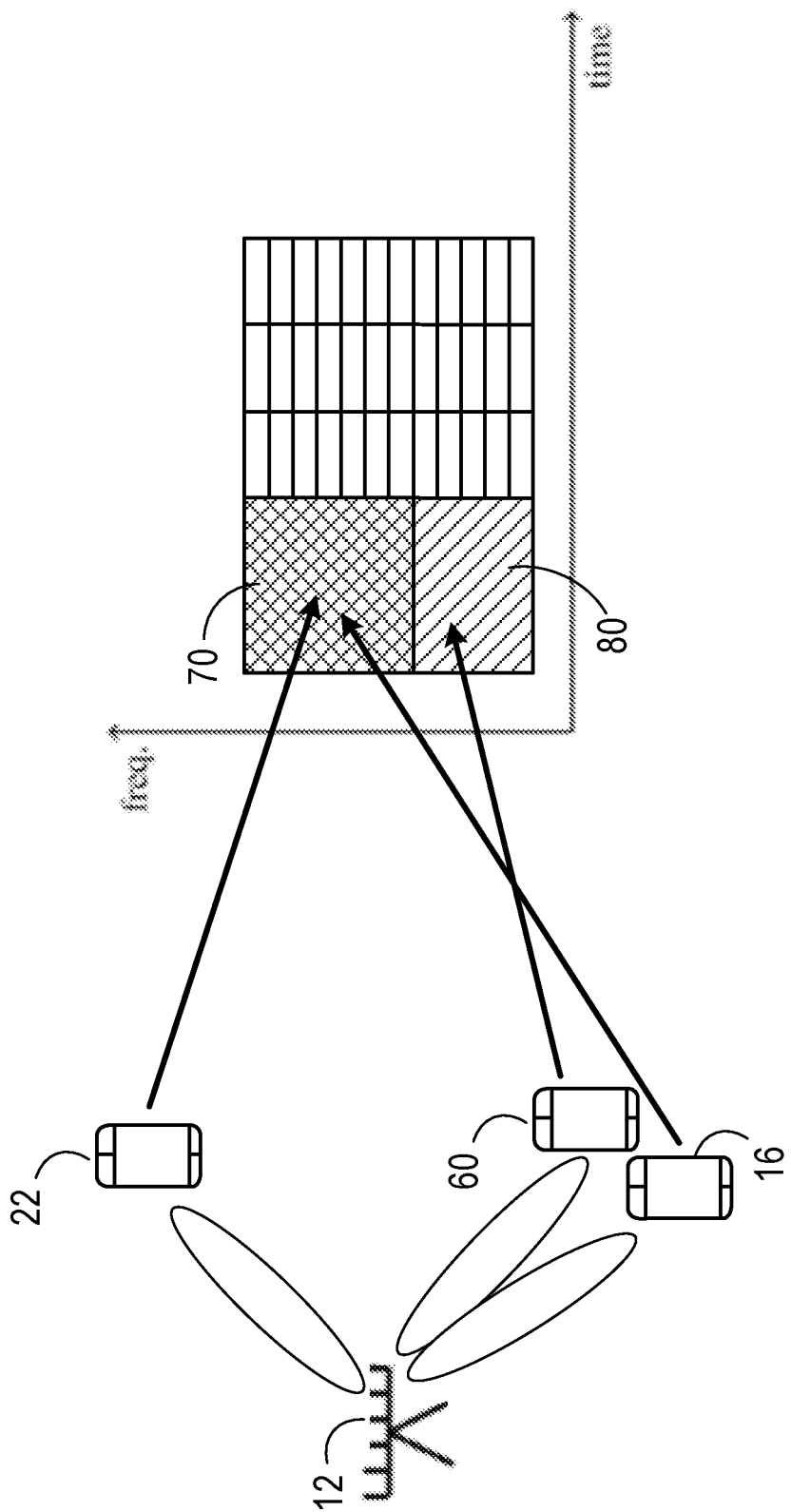
FIG. 8 illustrates a third wireless device entering a region in which another wireless device is operating.

As illustrated in FIG. 8, when a third wireless device 60 enters a region in which another wireless device, for example the first wireless device 16, is operating, the base station 12 may assign the third wireless device 60 to a different subset as the first wireless device 16. For example the third wireless device 60 may be assigned to a second subset in which control channel information is transmitted to wireless devices using radio resources 80.

Figure 9:
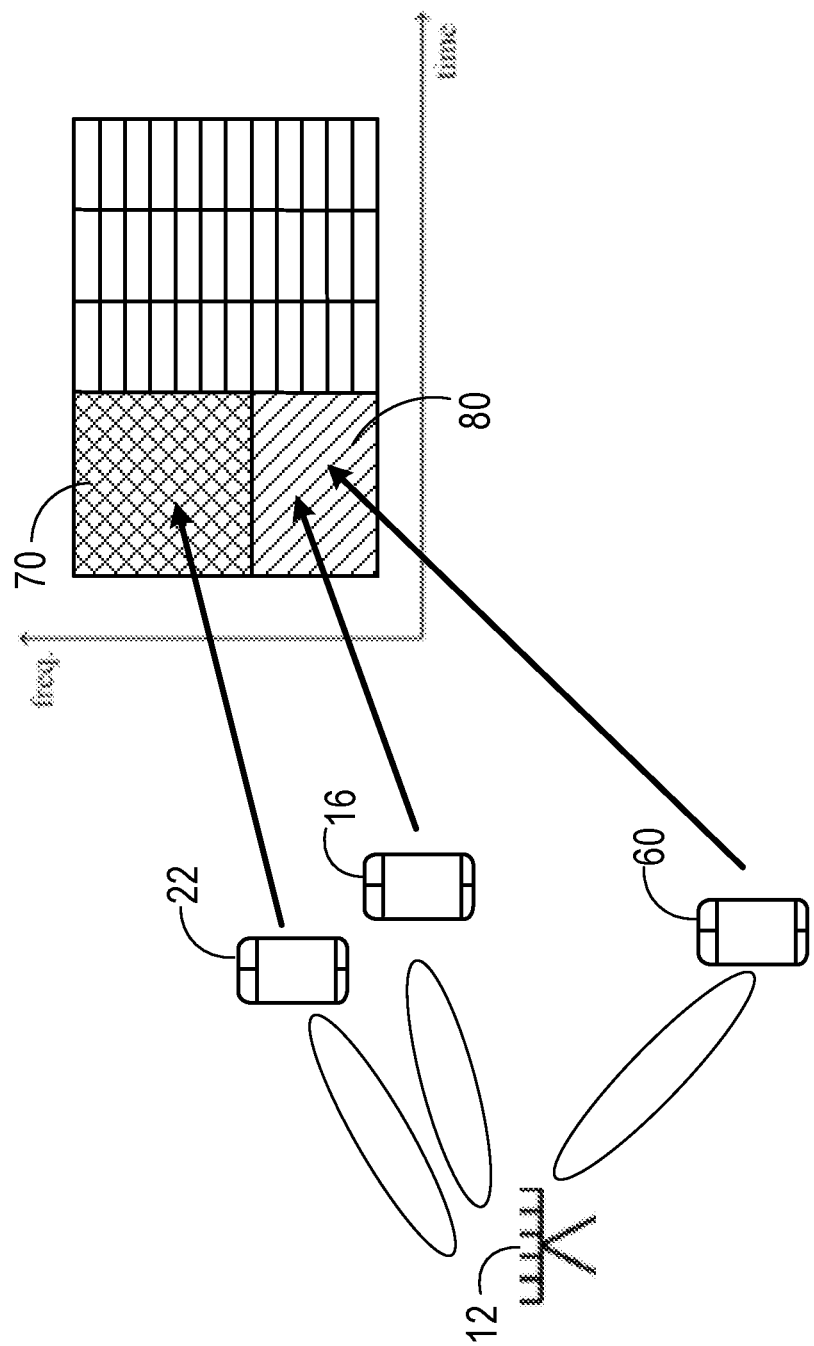
FIG. 9 illustrates a first wireless device moving within a cell to a new location where it is no longer well spatially separated from a second wireless device.

Next, suppose, as illustrated in FIG. 9, that the first wireless device 16 moves within the cell to a new location where it is no longer well spatially separated from the second wireless device 22. The base station 12 monitors the spatial relationships between the wireless devices and detects this change. The base station 12 may also detect that the first wireless device 16 is now well separated from the third wireless device 60, which was previously not the case. Based on this information, the base station may reassign the wireless devices to different subsets. In this example, the base station may reassign the first wireless device 16 from the first subset to the second subset.

The second subset therefore now comprises the first wireless device 16 and the third wireless device 60 as these wireless devices are spatially separated and control channel information may be transmitted to the first wireless device 16 and the third wireless device 60 using the same radio resources 80.

In some embodiments the radio resources used to transmit control channel information to each subset may partially overlap. The radio resources which are common to each subset may therefore be used to transmit common control channel information, addressing a plurality of wireless devices.

In some embodiments, the number of radio resources used to transmit radio resources to wireless devices in a subset may be different for each subset. The base station may take into account that some wireless devices are only capable of decoding control signals in a subset that is smaller or equal to a certain size and assigns such wireless devices to subsets which comply with these requirements.

In some embodiments, the size and number of subsets may be adapted to the set of wireless devices being served by the base station.

Figure 10:
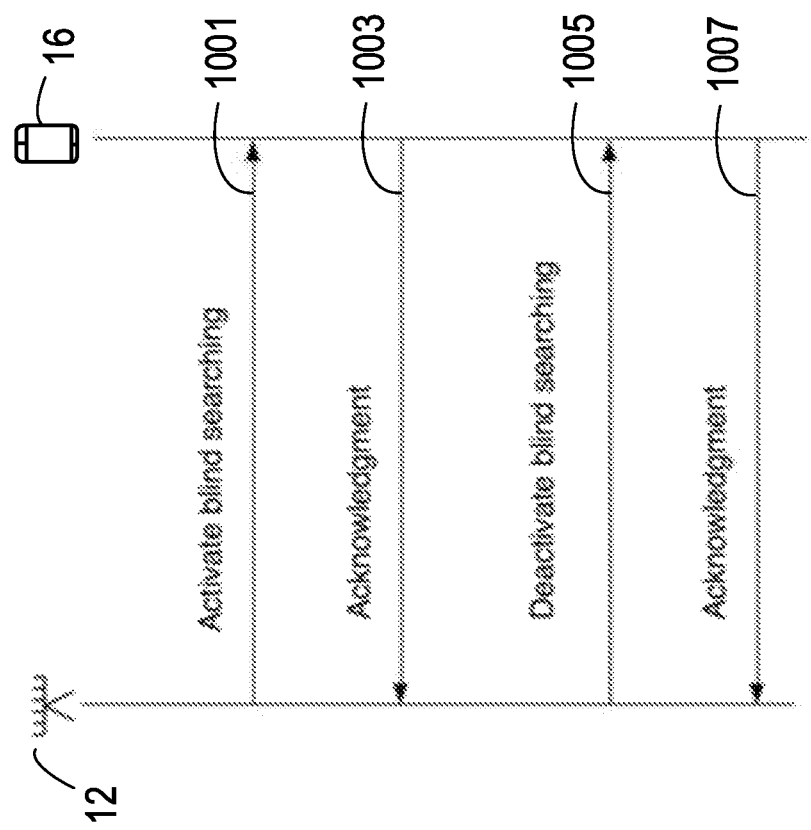
FIG. 10 illustrates an example of signalling between a base station and a wireless device.

FIG. 10 illustrates an example of signalling between a base station 12 and a wireless device 16. It will be appreciated that the wireless device may be any wireless device, for example any one of wireless devices 16, 22 and 60.

The base station 12 firstly transmits a signal 1001 to the wireless device 16 to activate blind searching for control channel information. In other words, the signal 1001 indicates that the wireless device 16 should operate in the second mode of operation. This may occur in response to a determination that the wireless device 16 may be likely to interfere with another wireless device. For example, the base station may have determined that the spatial relationship between the wireless device and another wireless device meets the predetermined condition, as described above.

The wireless device 16 may transmit an acknowledgement 1003 of the activation of the second mode of operation, and will proceed to blindly search a predetermined plurality of search space entries for the control channel information.

In some circumstances, the wireless device 16 may then move away from other wireless devices in the cell served by the base station 12, such that the wireless device 16 is spatially separated from all other wireless devices. The base station 12 may detect this and transmit a signal 1005 to deactivate the blind searching in the wireless device 16. In other words, the signal 1005 indicates that the wireless device should operate in the first mode of operation. The base station 12 may also indicate in this deactivation, which radio resources will be used to transmit control channel information to the wireless device 16.

The wireless device 16 may transmit an acknowledgment 1007 of the deactivation of the blind searching for control channel information, and may be configured to then decode the radio resources indicated by the base station 12 to obtain the control channel information.

Figure 11:
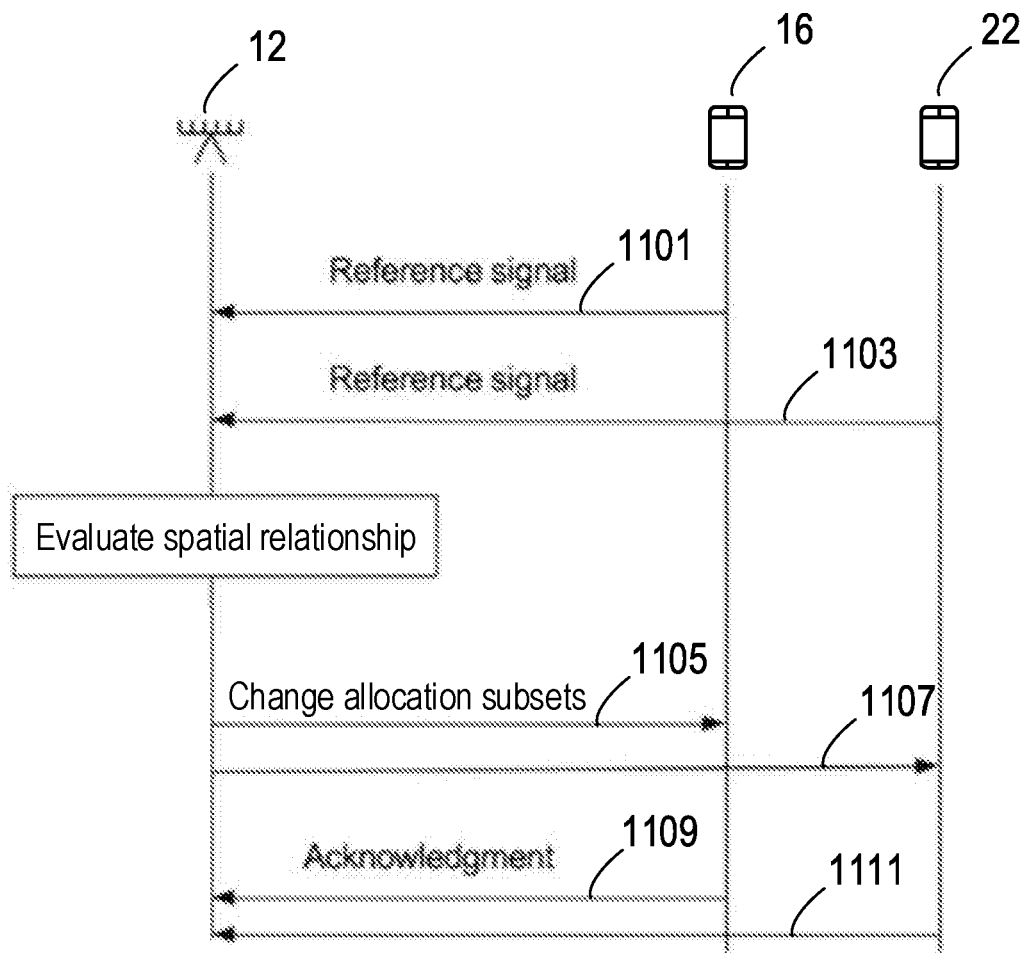
FIG. 11 illustrates an example of signalling between a base station, a first wireless device and a second wireless device.

FIG. 11 illustrates an example of signalling between a base station 12, a first wireless device 16 and a second wireless device 22.

The first wireless device 16 and the second wireless device 22 transmit uplink reference signals 1101 and 1103 to the base station. The base station 12 may then perform channel estimation of the wireless channels between the antennas of the base station 12 and the wireless devices 16 and 22, as described above with reference to FIGS. 3a and 3b. The estimations of the wireless channels may then be used to evaluate the spatial relationship between the first wireless device and the second wireless device. For example, the base station may determine whether an eigenspace describing a first wireless channel between the base station 12 and the first wireless device 16 overlaps with a an eigenspace describing the second wireless channel between the base station 12 and the second wireless device 22.

If the relationship between the eigenspaces of the first wireless channel and the second wireless channel changes, i.e. changes from at least partially overlapping, to having no overlap, or vice versa, the base station may reallocate the first wireless device and/or the second wireless device to different subsets, as described with respect to FIGS. 7, 8 and 9.

For example, if the first wireless device 16 and the second wireless device 22 are currently allocated to the same subset and the relationship between the eigenspace of the first wireless channel and the eigenspace second wireless channel changes such that they now at least partially overlap, the base station may reallocate one of the first and second wireless devices to a different subset.

The base station 12 may then transmit signals 1105 and 1107 to the first and second wireless devices respectively, indicating to the first and second wireless device how they have been reallocated into different subsets.

The first and second wireless devices 16, 22 may then transmit acknowledgements 1109, 1111, to the base station, and may change operation in line with the reallocation into different subsets. Embodiments disclosed herein therefore first determine how close together two wireless devices being served by a base station are, and then determine whether to use spatial multiplexing to transmit control channel information based on how far apart the wireless devices are. In other words, when wireless devices can be sufficiently serviced by spatially multiplexing of the control channel information, for example the channel vectors are sufficiently different that any interference between the control channel information would be insignificant, then spatial multiplexing may be used to save power at the wireless devices. In contrast, when wireless devices cannot be sufficiently served by using spatial multiplexing of the control channel information, the control channel information may be transmitted to the wireless devices on orthogonal radio resources to avoid interference, and the wireless devices may be configured to blindly search for the control channel information.

Embodiments disclosed herein may result in improved accuracy in detecting control channel information, leading to more robust system operation. Furthermore, embodiments disclosed herein may result in improved signal to noise ratios in detecting control channel information, due to the use of beamforming in transmitting control channel information, leading to more robust system operation.

Figure 12:
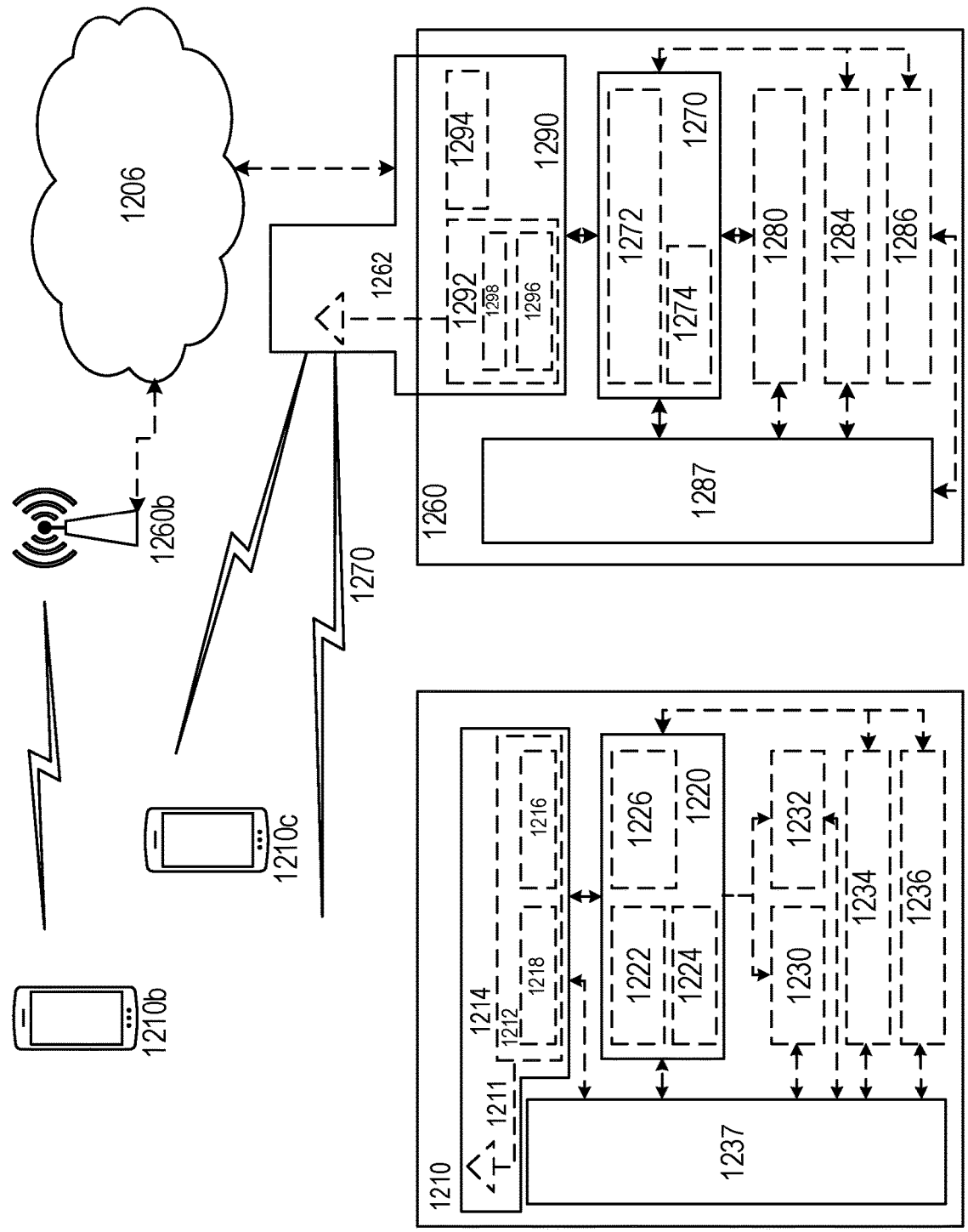
FIG. 12 illustrates a wireless network in accordance with some embodiments.

FIG. 12 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 12. For simplicity, the wireless network of FIG. 12 only depicts network 1206, network nodes 1260 and 1260b, and WDs 1210, 1210b, and 1210c. In practice, a wireless network may further include any additional elements suitable to support communication between wireless devices or between a wireless device and another communication device, such as a landline telephone, a service provider, or any other network node or end device. Of the illustrated components, network node 1260 and wireless device (WD) 1210 are depicted with additional detail. For example the network node 1260 may be a base station 12 as described with reference to FIGS. 1 to 11. The wireless device 1210 may be a first wireless device 16 as described with respect to FIGS. 1 to 11. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures.

Network 1206 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1260 and WD 1210 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 12, network node 1260 includes processing circuitry 1270, device readable medium 1280, interface 1290, auxiliary equipment 1284, power source 1286, power circuitry 1287, and antenna 1262. Although network node 1260 illustrated in the example wireless network of FIG. 12 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1260 are depicted as single boxes located within a larger box, or nested within multiple boxes, in practice, a network node may comprise multiple different physical components that make up a single illustrated component (e.g., device readable medium 1280 may comprise multiple separate hard drives as well as multiple RAM modules). For example, the network node 1260 may be for transmitting first control channel information to a first wireless device and second control channel information to a second wireless device in a wireless communications network. The network node 1260 may comprise an interface 1290, and processing circuitry 1270 configured to obtain an indication of whether a spatial relationship between the first wireless device and the second wireless device meets a predetermined condition; and cause the network node to operate in one of a first mode or a second mode based on the indication. In the first mode the network node 1260 is configured to transmit the first control channel information and the second control channel information using common radio resources; and in the second mode the network node 1260 is configured to transmit first control channel information to the first wireless device and the second control channel information to the second wireless device using orthogonal radio resources.

Similarly, network node 1260 may be composed of multiple physically separate components (e.g., a NodeB component and a RNC component, or a BTS component and a BSC component, etc.), which may each have their own respective components. In certain scenarios in which network node 1260 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1260 may be configured to support multiple radio access technologies (RATs). In such embodiments, some components may be duplicated (e.g., separate device readable medium 1280 for the different RATs) and some components may be reused (e.g., the same antenna 1262 may be shared by the RATs). Network node 1260 may also include multiple sets of the various illustrated components for different wireless technologies integrated into network node 1260, such as, for example, GSM, WCDMA, LTE, NR, WiFi, or Bluetooth wireless technologies. These wireless technologies may be integrated into the same or different chip or set of chips and other components within network node 1260.

Processing circuitry 1270 is configured to perform any determining, calculating, or similar operations (e.g., certain obtaining operations) described herein as being provided by a network node. These operations performed by processing circuitry 1270 may include processing information obtained by processing circuitry 1270 by, for example, converting the obtained information into other information, comparing the obtained information or converted information to information stored in the network node, and/or performing one or more operations based on the obtained information or converted information, and as a result of said processing making a determination.

Processing circuitry 1270 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1260 components, such as device readable medium 1280, network node 1260 functionality. For example, processing circuitry 1270 may execute instructions stored in device readable medium 1280 or in memory within processing circuitry 1270. Such functionality may include providing any of the various wireless features, functions, or benefits discussed herein. In some embodiments, processing circuitry 1270 may include a system on a chip (SOC).

In some embodiments, processing circuitry 1270 may include one or more of radio frequency (RF) transceiver circuitry 1272 and baseband processing circuitry 1274. In some embodiments, radio frequency (RF) transceiver circuitry 1272 and baseband processing circuitry 1274 may be on separate chips (or sets of chips), boards, or units, such as radio units and digital units. In alternative embodiments, part or all of RF transceiver circuitry 1272 and baseband processing circuitry 1274 may be on the same chip or set of chips, boards, or units.

In certain embodiments, some or all of the functionality described herein as being provided by a network node, base station, eNB or other such network device may be performed by processing circuitry 1270 executing instructions stored on device readable medium 1280 or memory within processing circuitry 1270. In alternative embodiments, some or all of the functionality may be provided by processing circuitry 1270 without executing instructions stored on a separate or discrete device readable medium, such as in a hard-wired manner. In any of those embodiments, whether executing instructions stored on a device readable storage medium or not, processing circuitry 1270 can be configured to perform the described functionality. The benefits provided by such functionality are not limited to processing circuitry 1270 alone or to other components of network node 1260, but are enjoyed by network node 1260 as a whole, and/or by end users and the wireless network generally.

Device readable medium 1280 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1270. Device readable medium 1280 may store any suitable instructions, data or information, including a computer program, software, an application including one or more of logic, rules, code, tables, etc. and/or other instructions capable of being executed by processing circuitry 1270 and, utilized by network node 1260. Device readable medium 1280 may be used to store any calculations made by processing circuitry 1270 and/or any data received via interface 1290. In some embodiments, processing circuitry 1270 and device readable medium 1280 may be considered to be integrated.

Interface 1290 is used in the wired or wireless communication of signalling and/or data between network node 1260, network 1206, and/or WDs 1210. As illustrated, interface 1290 comprises port(s)/terminal(s) 1294 to send and receive data, for example to and from network 1206 over a wired connection. Interface 1290 also includes radio front end circuitry 1292 that may be coupled to, or in certain embodiments a part of, antenna 1262. Radio front end circuitry 1292 comprises filters 1298 and amplifiers 1296. Radio front end circuitry 1292 may be connected to antenna 1262 and processing circuitry 1270. Radio front end circuitry may be configured to condition signals communicated between antenna 1262 and processing circuitry 1270. Radio front end circuitry 1292 may receive digital data that is to be sent out to other network nodes or WDs via a wireless connection. Radio front end circuitry 1292 may convert the digital data into a radio signal having the appropriate channel and bandwidth parameters using a combination of filters 1298 and/or amplifiers 1296. The radio signal may then be transmitted via antenna 1262. Similarly, when receiving data, antenna 1262 may collect radio signals which are then converted into digital data by radio front end circuitry 1292. The digital data may be passed to processing circuitry 1270. In other embodiments, the interface may comprise different components and/or different combinations of components.

In certain alternative embodiments, network node 1260 may not include separate radio front end circuitry 1292, instead, processing circuitry 1270 may comprise radio front end circuitry and may be connected to antenna 1262 without separate radio front end circuitry 1292. Similarly, in some embodiments, all or some of RF transceiver circuitry 1272 may be considered a part of interface 1290. In still other embodiments, interface 1290 may include one or more ports or terminals 1294, radio front end circuitry 1292, and RF transceiver circuitry 1272, as part of a radio unit (not shown), and interface 1290 may communicate with baseband processing circuitry 1274, which is part of a digital unit (not shown).

Antenna 1262 may include one or more antennas, or antenna arrays, configured to send and/or receive wireless signals. Antenna 1262 may be coupled to radio front end circuitry 1290 and may be any type of antenna capable of transmitting and receiving data and/or signals wirelessly. In some embodiments, antenna 1262 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1262 may be separate from network node 1260 and may be connectable to network node 1260 through an interface or port.

Antenna 1262, interface 1290, and/or processing circuitry 1270 may be configured to perform any receiving operations and/or certain obtaining operations described herein as being performed by a network node. Any information, data and/or signals may be received from a wireless device, another network node and/or any other network equipment. Similarly, antenna 1262, interface 1290, and/or processing circuitry 1270 may be configured to perform any transmitting operations described herein as being performed by a network node. Any information, data and/or signals may be transmitted to a wireless device, another network node and/or any other network equipment.

Power circuitry 1287 may comprise, or be coupled to, power management circuitry and is configured to supply the components of network node 1260 with power for performing the functionality described herein. Power circuitry 1287 may receive power from power source 1286. Power source 1286 and/or power circuitry 1287 may be configured to provide power to the various components of network node 1260 in a form suitable for the respective components (e.g., at a voltage and current level needed for each respective component). Power source 1286 may either be included in, or external to, power circuitry 1287 and/or network node 1260. For example, network node 1260 may be connectable to an external power source (e.g., an electricity outlet) via an input circuitry or interface such as an electrical cable, whereby the external power source supplies power to power circuitry 1287. As a further example, power source 1286 may comprise a source of power in the form of a battery or battery pack which is connected to, or integrated in, power circuitry 1287. The battery may provide backup power should the external power source fail. Other types of power sources, such as photovoltaic devices, may also be used.

Alternative embodiments of network node 1260 may include additional components beyond those shown in FIG. 12 that may be responsible for providing certain aspects of the network node's functionality, including any of the functionality described herein and/or any functionality necessary to support the subject matter described herein. For example, network node 1260 may include user interface equipment to allow input of information into network node 1260 and to allow output of information from network node 1260. This may allow a user to perform diagnostic, maintenance, repair, and other administrative functions for network node 1260.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1210 includes antenna 1211, interface 1214, processing circuitry 1220, device readable medium 1230, user interface equipment 1232, auxiliary equipment 1234, power source 1236 and power circuitry 1237. WD 1210 may include multiple sets of one or more of the illustrated components for different wireless technologies supported by WD 1210, such as, for example, GSM, WCDMA, LTE, NR, WiFi, WiMAX, or Bluetooth wireless technologies, just to mention a few. These wireless technologies may be integrated into the same or different chips or set of chips as other components within WD 1210.

Antenna 1211 may include one or more antennas or antenna arrays, configured to send and/or receive wireless signals, and is connected to interface 1214. In certain alternative embodiments, antenna 1211 may be separate from WD 1210 and be connectable to WD 1210 through an interface or port. Antenna 1211, interface 1214, and/or processing circuitry 1220 may be configured to perform any receiving or transmitting operations described herein as being performed by a WD. Any information, data and/or signals may be received from a network node and/or another WD. In some embodiments, radio front end circuitry and/or antenna 1211 may be considered an interface. For example the first wireless device 1210 may be for obtaining control channel information from a base station. The wireless device may comprise an interface 1214 and processing circuitry 1220 configured to receive an indication from the base station to operate in one of a first mode and a second mode; and cause the first wireless device 1210 to operate in one of the first mode and the second mode based on the indication, wherein in the first mode, the first wireless device 1210 is configured to attempt to decode one or more first predetermined search space entries in order to obtain the first control channel information each search space entry defining radio resources, and wherein the first control channel information is to be transmitted on radio resources defined by one of the one or more first predetermined search space entries, and in the second mode the first wireless device is configured to attempt to decode a plurality of second predetermined search space entries in order to obtain the first control channel information, each search space entry defining radio resources, and wherein the first control channel information is to be transmitted on radio resources defined by one of the plurality of second predetermined search space entries; wherein the number of first predetermined search space entries is less than the number of second predetermined search space entries.

As illustrated, interface 1214 comprises radio front end circuitry 1212 and antenna 1211. Radio front end circuitry 1212 comprise one or more filters 1218 and amplifiers 1216. Radio front end circuitry 1214 is connected to antenna 1211 and processing circuitry 1220, and is configured to condition signals communicated between antenna 1211 and processing circuitry 1220. Radio front end circuitry 1212 may be coupled to or a part of antenna 1211. In some embodiments, WD 1210 may not include separate radio front end circuitry 1212; rather, processing circuitry 1220 may comprise radio front end circuitry and may be connected to antenna 1211. Similarly, in some embodiments, some or all of RF transceiver circuitry 1222 may be considered a part of interface 1214. Radio front end circuitry 1212 may receive digital data that is to be sent out to other network nodes or WDs via a wireless connection. Radio front end circuitry 1212 may convert the digital data into a radio signal having the appropriate channel and bandwidth parameters using a combination of filters 1218 and/or amplifiers 1216. The radio signal may then be transmitted via antenna 1211. Similarly, when receiving data, antenna 1211 may collect radio signals which are then converted into digital data by radio front end circuitry 1212. The digital data may be passed to processing circuitry 1220. In other embodiments, the interface may comprise different components and/or different combinations of components.

Processing circuitry 1220 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1210 components, such as device readable medium 1230, WD 1210 functionality. Such functionality may include providing any of the various wireless features or benefits discussed herein. For example, processing circuitry 1220 may execute instructions stored in device readable medium 1230 or in memory within processing circuitry 1220 to provide the functionality disclosed herein.

As illustrated, processing circuitry 1220 includes one or more of RF transceiver circuitry 1222, baseband processing circuitry 1224, and application processing circuitry 1226. In other embodiments, the processing circuitry may comprise different components and/or different combinations of components. In certain embodiments processing circuitry 1220 of WD 1210 may comprise a SOC. In some embodiments, RF transceiver circuitry 1222, baseband processing circuitry 1224, and application processing circuitry 1226 may be on separate chips or sets of chips. In alternative embodiments, part or all of baseband processing circuitry 1224 and application processing circuitry 1226 may be combined into one chip or set of chips, and RF transceiver circuitry 1222 may be on a separate chip or set of chips. In still alternative embodiments, part or all of RF transceiver circuitry 1222 and baseband processing circuitry 1224 may be on the same chip or set of chips, and application processing circuitry 1226 may be on a separate chip or set of chips. In yet other alternative embodiments, part or all of RF transceiver circuitry 1222, baseband processing circuitry 1224, and application processing circuitry 1226 may be combined in the same chip or set of chips. In some embodiments, RF transceiver circuitry 1222 may be a part of interface 1214. RF transceiver circuitry 1222 may condition RF signals for processing circuitry 1220.

In certain embodiments, some or all of the functionality described herein as being performed by a WD may be provided by processing circuitry 1220 executing instructions stored on device readable medium 1230, which in certain embodiments may be a computer-readable storage medium. In alternative embodiments, some or all of the functionality may be provided by processing circuitry 1220 without executing instructions stored on a separate or discrete device readable storage medium, such as in a hard-wired manner. In any of those particular embodiments, whether executing instructions stored on a device readable storage medium or not, processing circuitry 1220 can be configured to perform the described functionality. The benefits provided by such functionality are not limited to processing circuitry 1220 alone or to other components of WD 1210, but are enjoyed by WD 1210 as a whole, and/or by end users and the wireless network generally.

Processing circuitry 1220 may be configured to perform any determining, calculating, or similar operations (e.g., certain obtaining operations) described herein as being performed by a WD. These operations, as performed by processing circuitry 1220, may include processing information obtained by processing circuitry 1220 by, for example, converting the obtained information into other information, comparing the obtained information or converted information to information stored by WD 1210, and/or performing one or more operations based on the obtained information or converted information, and as a result of said processing making a determination.

Device readable medium 1230 may be operable to store a computer program, software, an application including one or more of logic, rules, code, tables, etc. and/or other instructions capable of being executed by processing circuitry 1220. Device readable medium 1230 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1220. In some embodiments, processing circuitry 1220 and device readable medium 1230 may be considered to be integrated.

User interface equipment 1232 may provide components that allow for a human user to interact with WD 1210. Such interaction may be of many forms, such as visual, audial, tactile, etc. User interface equipment 1232 may be operable to produce output to the user and to allow the user to provide input to WD 1210. The type of interaction may vary depending on the type of user interface equipment 1232 installed in WD 1210. For example, if WD 1210 is a smart phone, the interaction may be via a touch screen; if WD 1210 is a smart meter, the interaction may be through a screen that provides usage (e.g., the number of gallons used) or a speaker that provides an audible alert (e.g., if smoke is detected). User interface equipment 1232 may include input interfaces, devices and circuits, and output interfaces, devices and circuits. User interface equipment 1232 is configured to allow input of information into WD 1210, and is connected to processing circuitry 1220 to allow processing circuitry 1220 to process the input information. User interface equipment 1232 may include, for example, a microphone, a proximity or other sensor, keys/buttons, a touch display, one or more cameras, a USB port, or other input circuitry. User interface equipment 1232 is also configured to allow output of information from WD 1210, and to allow processing circuitry 1220 to output information from WD 1210. User interface equipment 1232 may include, for example, a speaker, a display, vibrating circuitry, a USB port, a headphone interface, or other output circuitry. Using one or more input and output interfaces, devices, and circuits, of user interface equipment 1232, WD 1210 may communicate with end users and/or the wireless network, and allow them to benefit from the functionality described herein.

Auxiliary equipment 1234 is operable to provide more specific functionality which may not be generally performed by WDs. This may comprise specialized sensors for doing measurements for various purposes, interfaces for additional types of communication such as wired communications etc. The inclusion and type of components of auxiliary equipment 1234 may vary depending on the embodiment and/or scenario.

Power source 1236 may, in some embodiments, be in the form of a battery or battery pack. Other types of power sources, such as an external power source (e.g., an electricity outlet), photovoltaic devices or power cells, may also be used. WD 1210 may further comprise power circuitry 1237 for delivering power from power source 1236 to the various parts of WD 1210 which need power from power source 1236 to carry out any functionality described or indicated herein. Power circuitry 1237 may in certain embodiments comprise power management circuitry. Power circuitry 1237 may additionally or alternatively be operable to receive power from an external power source; in which case WD 1210 may be connectable to the external power source (such as an electricity outlet) via input circuitry or an interface such as an electrical power cable. Power circuitry 1237 may also in certain embodiments be operable to deliver power from an external power source to power source 1236. This may be, for example, for the charging of power source 1236. Power circuitry 1237 may perform any formatting, converting, or other modification to the power from power source 1236 to make the power suitable for the respective components of WD 1210 to which power is supplied.

FIG. 12 illustrates one embodiment of a wireless device in accordance with various aspects described herein. As used herein, a wireless device, user equipment or UE may not necessarily have a user in the sense of a human user who owns and/or operates the relevant device. Instead, a wireless device may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). Wireless device 1210 may be any wireless device identified by the $3^{rd}$ Generation Partnership Project (3GPP), including a NB-IoT UE, a machine type communication (MTC) UE, and/or an enhanced MTC (eMTC) UE. Wireless device 1210 as illustrated in FIG. 12, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 12 is a wireless device, the components discussed herein are equally applicable to a UE, and vice-versa.

Figure 13:
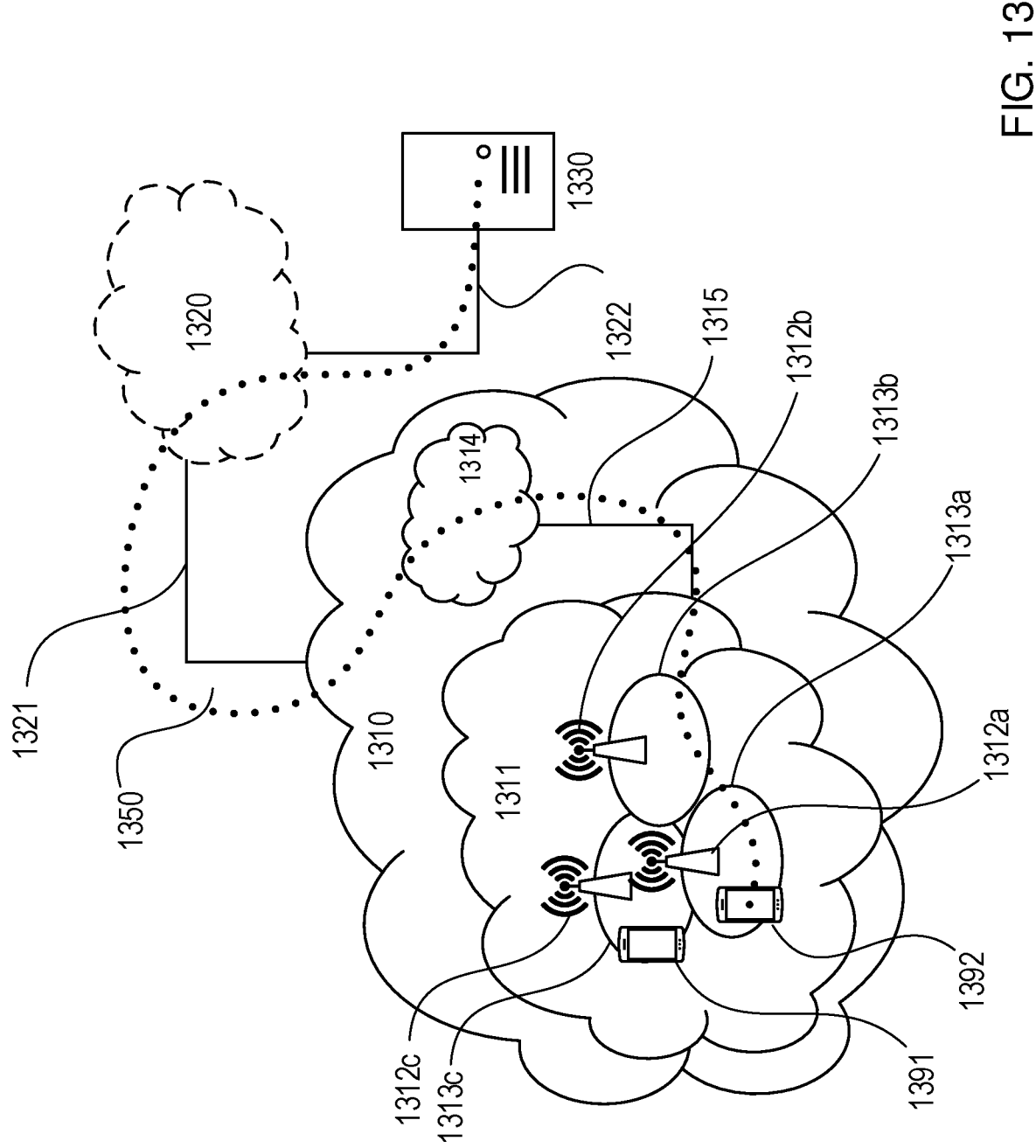
FIG. 13 illustrates a telecommunication network connected via an intermediate network to a host computer in accordance with some embodiments.

FIG. 13 illustrates a telecommunication network connected via an intermediate network to a host computer in accordance with some embodiments.

With reference to FIG. 13, in accordance with an embodiment, a communication system includes telecommunication network 1310, such as a 3GPP-type cellular network, which comprises access network 1311, such as a radio access network, and core network 1314. Access network 1311 comprises a plurality of network nodes 1312a, 1312b, 1312c, such as NBs, eNBs, gNBs or other types of wireless access points, each defining a corresponding coverage area 1313a, 1313b, 1313c. Each network node 1312a, 1312b, 1312c is connectable to core network 1314 over a wired or wireless connection 1315. A first wireless device 1391 located in coverage area 1313c is configured to wirelessly connect to, or be paged by, the corresponding network node 1312c. A second wireless device 1392 in coverage area 1313a is wirelessly connectable to the corresponding network node 1312a. While a plurality of wireless devices 1391, 1392 are illustrated in this example, the disclosed embodiments are equally applicable to a situation where a sole wireless device is in the coverage area or where a sole wireless device is connecting to the corresponding network node 1312.

Telecommunication network 1310 is itself connected to host computer 1330, which may be embodied in the hardware and/or software of a standalone server, a cloud-implemented server, a distributed server or as processing resources in a server farm. Host computer 1330 may be under the ownership or control of a service provider, or may be operated by the service provider or on behalf of the service provider. Connections 1321 and 1322 between telecommunication network 1310 and host computer 1330 may extend directly from core network 1314 to host computer 1330 or may go via an optional intermediate network 1320. Intermediate network 1320 may be one of, or a combination of more than one of, a public, private or hosted network; intermediate network 1320, if any, may be a backbone network or the Internet; in particular, intermediate network 1320 may comprise two or more sub-networks (not shown).

The communication system of FIG. 13 as a whole enables connectivity between the connected wireless devices 1391, 1392 and host computer 1330. The connectivity may be described as an over-the-top (OTT) connection 1350. Host computer 1330 and the connected wireless devices 1391, 1392 are configured to communicate data and/or signaling via OTT connection 1350, using access network 1311, core network 1314, any intermediate network 1320 and possible further infrastructure (not shown) as intermediaries. OTT connection 1350 may be transparent in the sense that the participating communication devices through which OTT connection 1350 passes are unaware of routing of uplink and downlink communications. For example, network node 1312 may not or need not be informed about the past routing of an incoming downlink communication with data originating from host computer 1330 to be forwarded (e.g., handed over) to a connected wireless device 1391. Similarly, network node 1312 need not be aware of the future routing of an outgoing uplink communication originating from the wireless device 1391 towards the host computer 1330.

Figure 14:
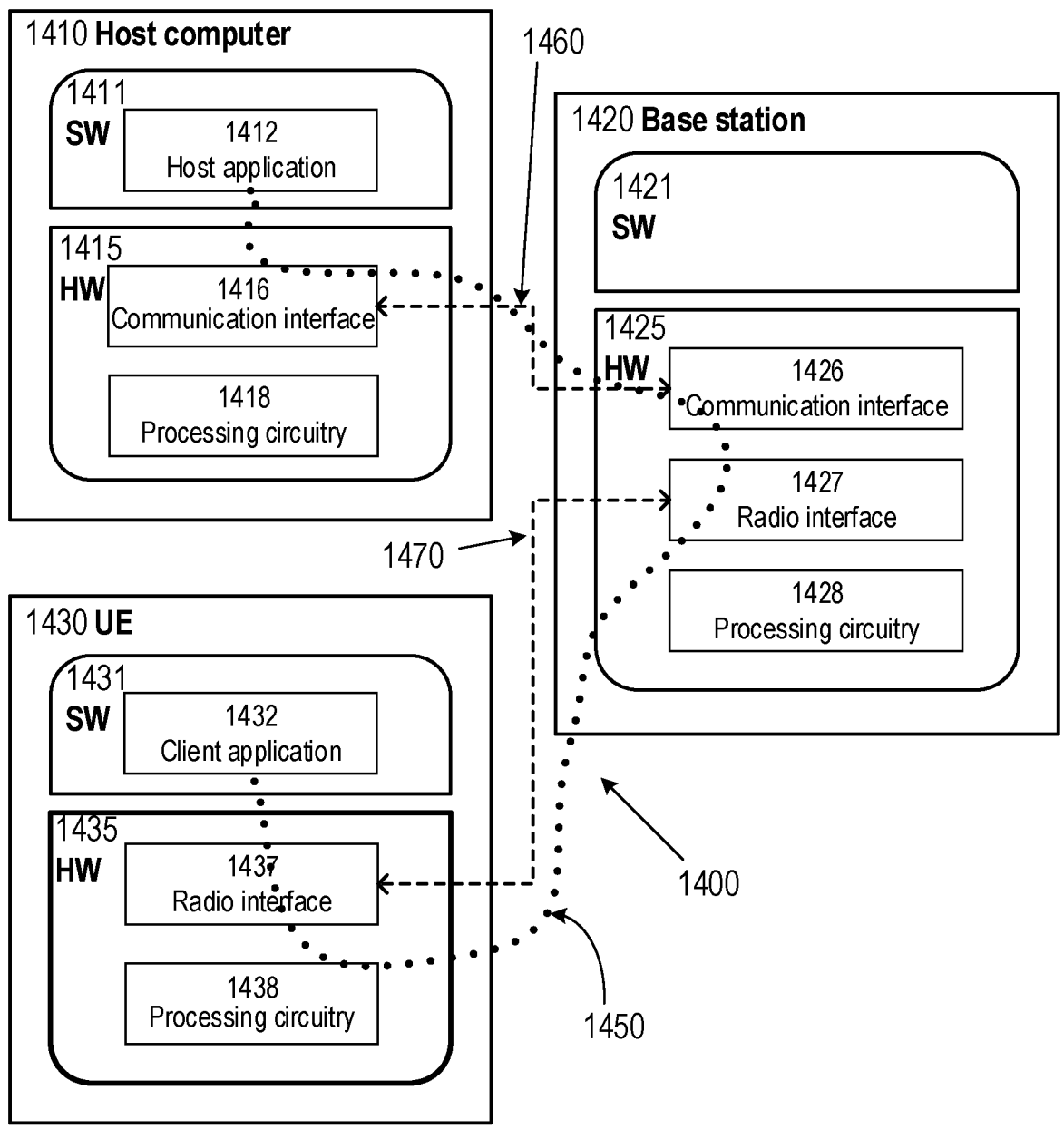
FIG. 14 illustrates a host computer communicating via a base station with a user equipment over a partially wireless connection in accordance with some embodiments.

FIG. 14 illustrates a host computer communicating via a network node with a wireless device over a partially wireless connection in accordance with some embodiments.

Example implementations, in accordance with an embodiment, of the wireless device, network node and host computer discussed in the preceding paragraphs will now be described with reference to FIG. 14. In communication system 1400, host computer 1410 comprises hardware 1415 including communication interface 1416 configured to set up and maintain a wired or wireless connection with an interface of a different communication device of communication system 1400. Host computer 1410 further comprises processing circuitry 1418, which may have storage and/or processing capabilities. In particular, processing circuitry 1418 may comprise one or more programmable processors, application-specific integrated circuits, field programmable gate arrays or combinations of these (not shown) adapted to execute instructions. Host computer 1410 further comprises software 1411, which is stored in or accessible by host computer 1410 and executable by processing circuitry 1418. Software 1411 includes host application 1812. Host application 1412 may be operable to provide a service to a remote user, such as wireless device 1430 connecting via OTT connection 1450 terminating at wireless device 1430 and host computer 1410. In providing the service to the remote user, host application 1412 may provide user data which is transmitted using OTT connection 1450.

Communication system 1400 further includes network node 1420 provided in a telecommunication system and comprising hardware 1425 enabling it to communicate with host computer 1410 and with wireless device 1430. Hardware 1425 may include communication interface 1426 for setting up and maintaining a wired or wireless connection with an interface of a different communication device of communication system 1400, as well as radio interface 1427 for setting up and maintaining at least wireless connection 1470 with wireless device 1430 located in a coverage area (not shown in FIG. 18) served by network node 1420. Communication interface 1426 may be configured to facilitate connection 1460 to host computer 1410. Connection 1460 may be direct or it may pass through a core network (not shown in FIG. 14) of the telecommunication system and/or through one or more intermediate networks outside the telecommunication system. In the embodiment shown, hardware 1425 of network node 1420 further includes processing circuitry 1428, which may comprise one or more programmable processors, application-specific integrated circuits, field programmable gate arrays or combinations of these (not shown) adapted to execute instructions. Network node 1420 further has software 1421 stored internally or accessible via an external connection.

Communication system 1400 further includes wireless device 1430 already referred to. Its hardware 1435 may include radio interface 1437 configured to set up and maintain wireless connection 1470 with a network node serving a coverage area in which wireless device 1430 is currently located. Hardware 1435 of wireless device 1430 further includes processing circuitry 1438, which may comprise one or more programmable processors, application-specific integrated circuits, field programmable gate arrays or combinations of these (not shown) adapted to execute instructions. Wireless device 1430 further comprises software 1431, which is stored in or accessible by wireless device 1430 and executable by processing circuitry 1438. Software 1431 includes client application 1832. Client application 1432 may be operable to provide a service to a human or non-human user via wireless device 1430, with the support of host computer 1410. In host computer 1410, an executing host application 1412 may communicate with the executing client application 1432 via OTT connection 1450 terminating at wireless device 1430 and host computer 1410. In providing the service to the user, client application 1432 may receive request data from host application 1412 and provide user data in response to the request data. OTT connection 1450 may transfer both the request data and the user data. Client application 1432 may interact with the user to generate the user data that it provides.

It is noted that host computer 1410, network node 1420 and wireless device 1430 illustrated in FIG. 14 may be similar or identical to host computer 1330, one of base stations 1312a, 1312b, 1312c and one of wireless devices 1391, 1392 of FIG. 13, respectively. This is to say, the inner workings of these entities may be as shown in FIG. 14 and independently, the surrounding network topology may be that of FIG. 13.

In FIG. 14, OTT connection 1450 has been drawn abstractly to illustrate the communication between host computer 1410 and wireless device 1430 via base station 1420, without explicit reference to any intermediary devices and the precise routing of messages via these devices. Network infrastructure may determine the routing, which it may be configured to hide from wireless device 1430 or from the service provider operating host computer 1410, or both. While OTT connection 1450 is active, the network infrastructure may further take decisions by which it dynamically changes the routing (e.g., on the basis of load balancing consideration or reconfiguration of the network).

Wireless connection 1470 between wireless device 1430 and base station 1420 is in accordance with the teachings of the embodiments described throughout this disclosure. One or more of the various embodiments improve the performance of OTT services provided to wireless device 1430 using OTT connection 1450, in which wireless connection 1470 forms the last segment. More precisely, the teachings of these embodiments may reduce the likelihood of interference between control channel information transmitted to wireless devices. Furthermore embodiments discloses herein provide benefits such as reduced power consumption of the wireless devices and reduced SNIR.

A measurement procedure may be provided for the purpose of monitoring data rate, latency and other factors on which the one or more embodiments improve. There may further be an optional network functionality for reconfiguring OTT connection 1450 between host computer 1410 and wireless device 1430, in response to variations in the measurement results. The measurement procedure and/or the network functionality for reconfiguring OTT connection 1450 may be implemented in software 1411 and hardware 1415 of host computer 1410 or in software 1431 and hardware 1435 of wireless device 1430, or both. In embodiments, sensors (not shown) may be deployed in or in association with communication devices through which OTT connection 1450 passes; the sensors may participate in the measurement procedure by supplying values of the monitored quantities exemplified above, or supplying values of other physical quantities from which software 1411, 1431 may compute or estimate the monitored quantities. The reconfiguring of OTT connection 1450 may include message format, retransmission settings, preferred routing etc.; the reconfiguring need not affect network node 1420, and it may be unknown or imperceptible to network node 1420. Such procedures and functionalities may be known and practiced in the art. In certain embodiments, measurements may involve proprietary wireless device signaling facilitating host computer 1410's measurements of throughput, propagation times, latency and the like. The measurements may be implemented in that software 1411 and 1431 causes messages to be transmitted, in particular empty or 'dummy' messages, using OTT connection 1450 while it monitors propagation times, errors etc.

Figure 15:
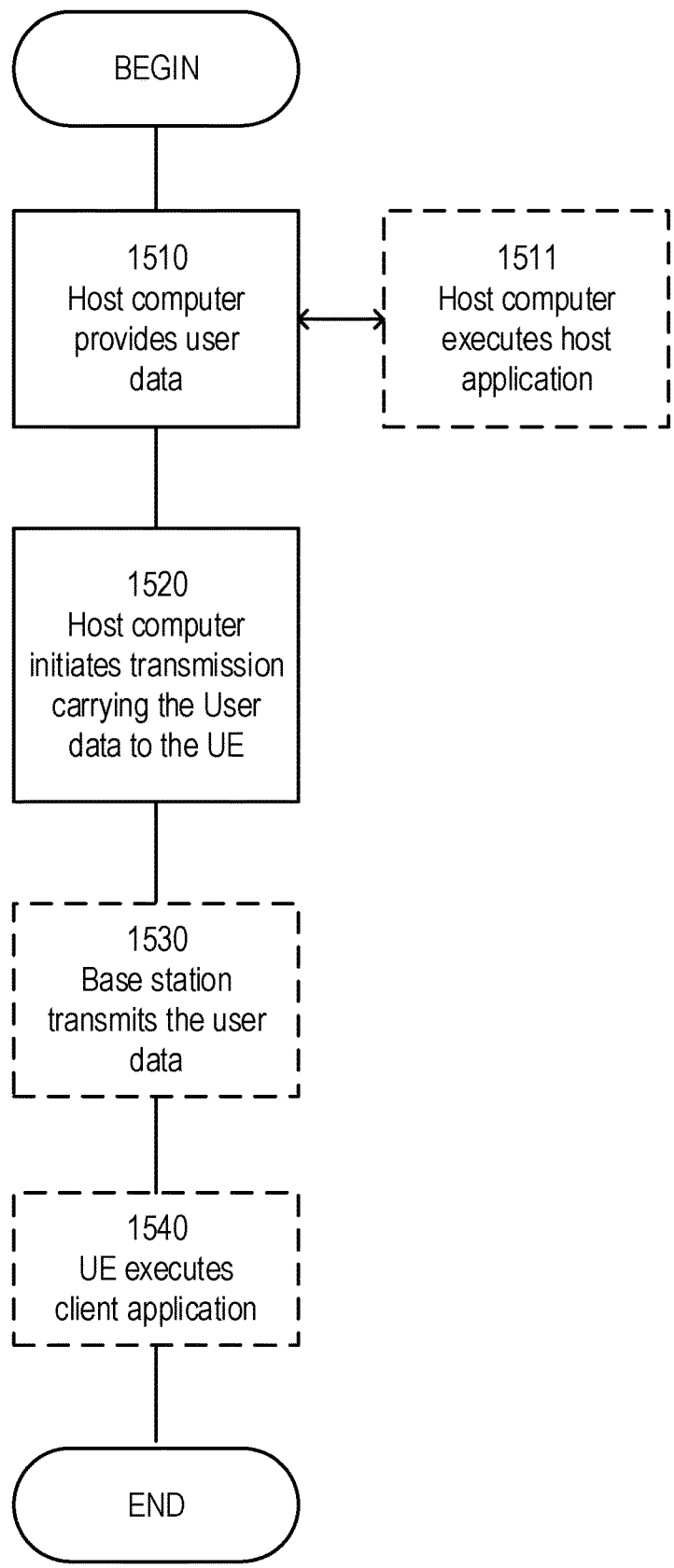
FIG. 15 illustrates methods implemented in a communication system including a host computer, a base station and a user equipment in accordance with some embodiments.

FIG. 15 illustrates methods implemented in a communication system including a host computer, a base station and a user equipment in accordance with some embodiments.

FIG. 15 is a flowchart illustrating a method implemented in a communication system, in accordance with one embodiment. The communication system includes a host computer, a network node and a wireless device which may be those described with reference to FIGS. 13 and 14. For simplicity of the present disclosure, only drawing references to FIG. 15 will be included in this section. In step 1510, the host computer provides user data. In substep 1511 (which may be optional) of step 1510, the host computer provides the user data by executing a host application. In step 1520, the host computer initiates a transmission carrying the user data to the wireless device. In step 1530 (which may be optional), the network node transmits to the wireless device the user data which was carried in the transmission that the host computer initiated, in accordance with the teachings of the embodiments described throughout this disclosure. For example, control channel information transmitted to the wireless device as described above may prepare the wireless device for a downlink transmission initiated by a host computer. In step 1540 (which may also be optional), the wireless device executes a client application associated with the host application executed by the host computer.

Figure 16:
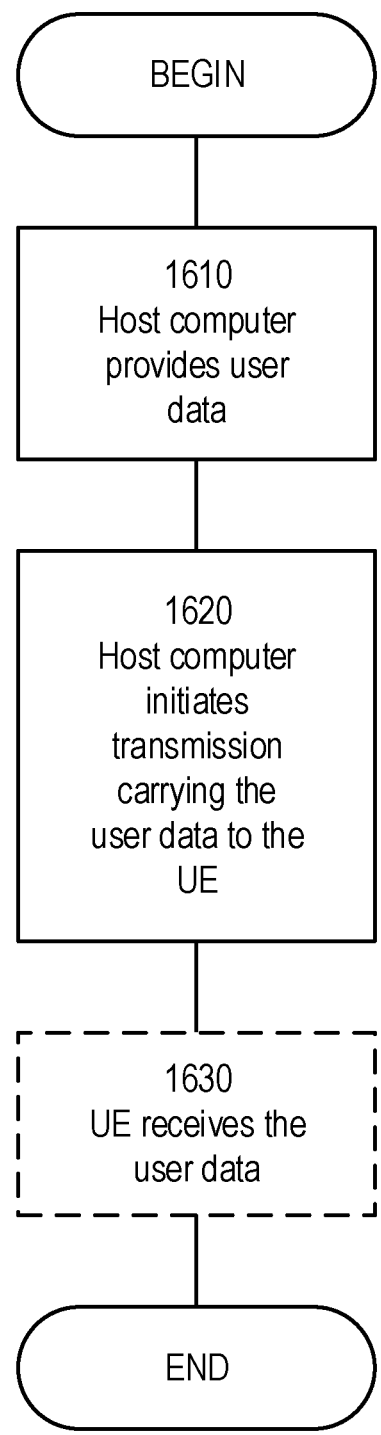
FIG. 16 illustrates methods implemented in a communication system including a host computer, a base station and a user equipment in accordance with some embodiments.

FIG. 16 illustrates methods implemented in a communication system including a host computer, a network node and a wireless device in accordance with some embodiments.

FIG. 16 is a flowchart illustrating a method implemented in a communication system, in accordance with one embodiment. The communication system includes a host computer, a network node and a wireless device which may be those described with reference to FIGS. 13 and 14. For simplicity of the present disclosure, only drawing references to FIG. 16 will be included in this section. In step 1610 of the method, the host computer provides user data. In an optional substep (not shown) the host computer provides the user data by executing a host application. In step 1620, the host computer initiates a transmission carrying the user data to the wireless device. The transmission may pass via the network node, in accordance with the teachings of the embodiments described throughout this disclosure. For example, control channel information transmitted to the wireless device as described above may prepare the wireless device for a downlink transmission initiated by a host computer. In step 1630 (which may be optional), the wireless device receives the user data carried in the transmission.

Figure 17:
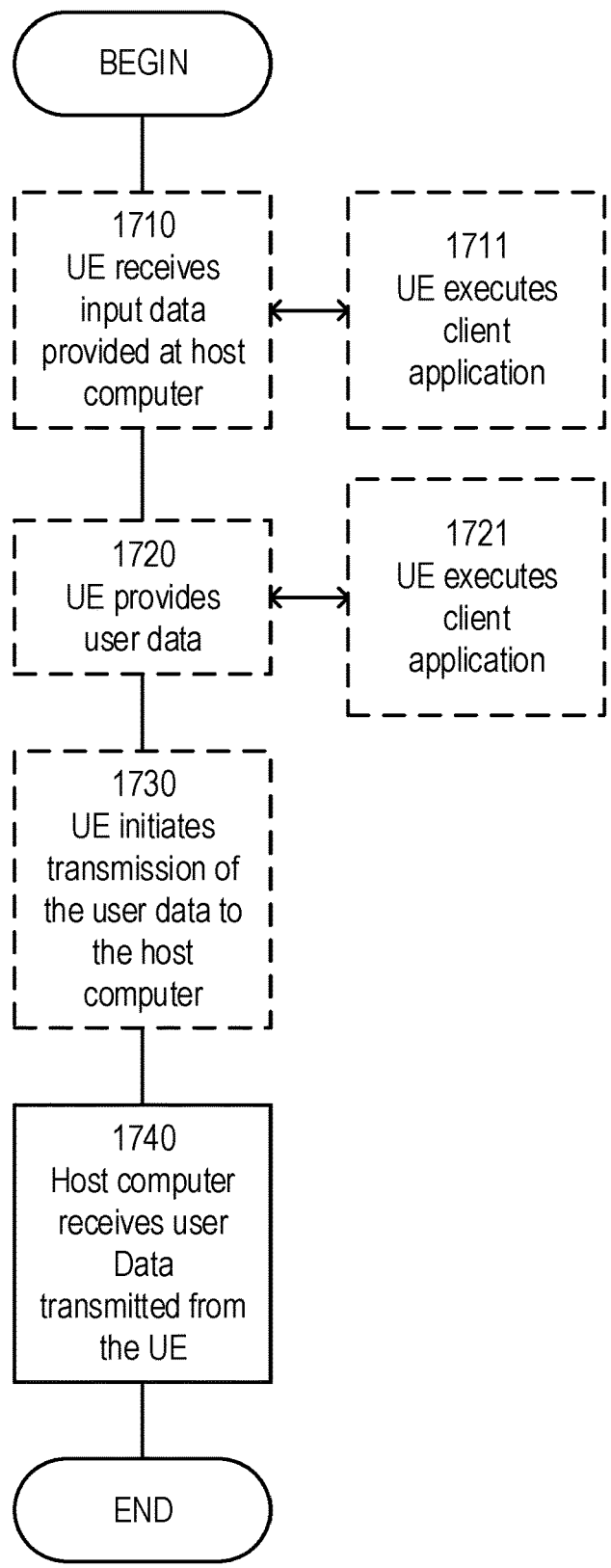
FIG. 17 illustrates methods implemented in a communication system including a host computer, a base station and a user equipment in accordance with some embodiments.

FIG. 17 illustrates methods implemented in a communication system including a host computer, a network node and a wireless device in accordance with some embodiments.

FIG. 17 is a flowchart illustrating a method implemented in a communication system, in accordance with one embodiment. The communication system includes a host computer, a network node and a wireless device which may be those described with reference to FIGS. 13 and 14. For simplicity of the present disclosure, only drawing references to FIG. 17 will be included in this section. In step 1710 (which may be optional), the wireless device receives input data provided by the host computer. Additionally or alternatively, in step 1720, the wireless device provides user data. In substep 1721 (which may be optional) of step 1720, the wireless device provides the user data by executing a client application. In substep 1711 (which may be optional) of step 1710, the wireless device executes a client application which provides the user data in reaction to the received input data provided by the host computer. In providing the user data, the executed client application may further consider user input received from the user. Regardless of the specific manner in which the user data was provided, the wireless device initiates, in substep 1730 (which may be optional), transmission of the user data to the host computer. In step 1740 of the method, the host computer receives the user data transmitted from the wireless device, in accordance with the teachings of the embodiments described throughout this disclosure. For example in accordance with the control channel information transmitted to the wireless device as described throughout this disclosure.

Figure 18:
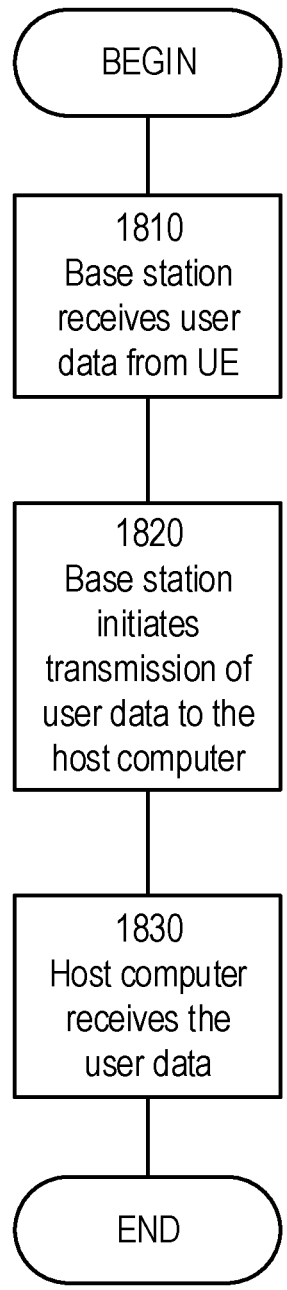
FIG. 18 illustrates methods implemented in a communication system including a host computer, a base station and a user equipment in accordance with some embodiments.

FIG. 18 illustrates methods implemented in a communication system including a host computer, a network node and a wireless device in accordance with some embodiments.

FIG. 18 is a flowchart illustrating a method implemented in a communication system, in accordance with one embodiment. The communication system includes a host computer, a network node and a wireless device which may be those described with reference to FIGS. 13 and 14. For simplicity of the present disclosure, only drawing references to FIG. 18 will be included in this section. In step 1810 (which may be optional), in accordance with the teachings of the embodiments described throughout this disclosure, the network node receives user data from the wireless device. In step 1820 (which may be optional), the network node initiates transmission of the received user data to the host computer. In step 1830 (which may be optional), the host computer receives the user data carried in the transmission initiated by the network node.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The invention claimed is:

1. A method, in a first wireless device, for obtaining control channel information from a base station, the method comprising:
  receiving an indication from the base station to operate in one of a first mode and a second mode, wherein the indication is based on whether a spatial relationship between the first wireless device and a second wireless device (22) served by the base station meets a predetermined condition; and
  operating in one of the first mode and the second mode based on the indication, wherein
    in the first mode, the first wireless device is configured to attempt to decode one or more first predetermined search space entries in order to obtain first control channel information, each first predetermined search space entry defining radio resources, and wherein the first control channel information is to be transmitted on radio resources defined by one of the one or more first predetermined search space entries, and
    in the second mode the first wireless device is configured to attempt to decode a plurality of second predetermined search space entries in order to obtain the first control channel information, each search space entry defining radio resources, and wherein the first control channel information is to be transmitted on radio resources defined by one of the plurality of second predetermined search space entries; wherein
  the number of first predetermined search space entries is less than the number of second predetermined search space entries.

2. The method as claimed in claim 1, wherein the spatial relationship comprises an indication of a likelihood of interference between signals transmitted to the first wireless device and the second wireless device using common radio resources.

3. The method as claimed in claim 1, wherein, in the first mode, the first wireless device is configured to attempt to decode the one or more first predetermined search space entries by initially attempting to decode a predefined one of the one or more first predetermined search space entries.

4. The method as claimed in claim 1, further comprising:
  receiving in the first control channel information an indication of radio resources which will be used to transmit payload data to the first wireless device.

5. The method as claimed in claim 1, wherein:
  in the second mode, the first wireless device is configured to receive an indication of a channel code for use in decoding second control channel information to be transmitted to the second wireless device, wherein
  the first wireless device is configured to attempt to decode a plurality of third predetermined search space entries using the channel code in order to obtain the second control channel information, each search space entry defining radio resources, and wherein the second control channel information is to be transmitted on radio resources defined by one of the plurality of third predetermined search space entries, wherein
  the radio resources defined by the third predetermined search space entries are orthogonal to the radio resources defined by the second predetermined search space entries.

6. The method as claimed in claim 5, further comprising:
  receiving payload data from the base station, and
  utilising the second control channel information to perform successive interference cancellation to suppress interference caused by payload data transmitted to the second wireless device.

7. A method, in a base station, for transmitting first control channel information to a first wireless device and second control channel information to a second wireless device in a wireless communications network, the method comprising:
  obtaining an indication of whether a spatial relationship between the first wireless device and the second wireless device meets a predetermined condition;
  operating in one of a first mode and a second mode based on the indication; and
  transmitting an indication to the first wireless device and the second wireless device of which of the first mode and the second mode the base station is operating in;
wherein;
  operating in the first mode comprises transmitting the first control channel information and the second control channel information using common radio resources, wherein the step of transmitting the first control channel information and the second control channel information using common radio resources comprises using spatial multiplexing of the first control channel information and the second control channel information over the common radio resources; and operating in the second mode comprises transmitting the first control channel information to the first wireless device and the second control channel information to the second wireless device using orthogonal radio resources.

8. The method as claimed in claim 7, wherein the spatial relationship comprises an indication of a likelihood of interference between signals transmitted to the first wireless device and the second wireless device using common radio resources.

9. The method as claimed in claim 7, wherein the spatial relationship comprises a physical separation between the first wireless device and the second wireless device.

10. The method as claimed in claim 9, wherein the physical separation comprises a distance between the first wireless device and the second wireless device.

11. The method as claimed in claim 10, further comprising:

calculating the distance between the first wireless device and the second wireless device by performing propagation delay calculations based on signals transmitted between the first wireless device and the base station, and based on signals transmitted between the second wireless device and the base station.

12. The method as claimed in claim 9, wherein the physical separation comprises an angle of separation between the first wireless device and the second wireless device.

13. The method as claimed in claim 9, wherein the predetermined condition is met if the physical separation is less than a threshold value.

14. The method as claimed in claim 9, wherein the predetermined condition comprises a condition that compares the physical separation to a first threshold when the physical separation is decreasing, and a condition that compares the physical separation to a second threshold when the physical separation is increasing.

15. The method as claimed in claim 7, wherein the spatial relationship comprises a relationship between an eigenspace describing a first wireless channel between the first wireless device and the base station, and an eigenspace describing a second wireless channel between the second wireless device and the base station.

16. The method as claimed in claim 15, wherein the predetermined condition comprises a condition that compares the eigenspace describing the first wireless channel with the eigenspace describing the second wireless channel.

17. The method as claimed in claim 16, wherein the predetermined condition is met if the eigenspace describing the first wireless channel at least partially overlaps with the eigenspace describing the second wireless channel.

18. The method as claimed in claim 7, further comprising:
operating in the second mode in response to the spatial relationship meeting the predetermined condition, and operating in the first mode in response to the spatial relationship not meeting the predetermined condition.

19. The method as claimed in claim 7, wherein operating in the second mode comprises:

indicating in the first control channel information, first radio resources which will be used to transmit payload data to the first wireless device, and indicating the second control channel information, second radio resources which will be used to transmit payload data to the second wireless device, wherein the second radio resources are orthogonal to the first radio resources.

20. The method as claimed in claim 7, wherein operating in the second mode comprises:

transmitting to the first wireless device an indication of a channel code for use in decoding the second control channel information.

21. The method as claimed in claim 20, wherein operating in the second mode further comprises:

transmitting first payload data to the first wireless device and second payload data to the second wireless device using common radio resources.

22. The method as claimed in claim 21, wherein the step of transmitting first payload data to the first wireless device and second payload data to the second wireless device comprises using non-orthogonal multiple access superposition encoding.

23. The method as claimed in claim 7, wherein operating in the second mode comprises:

indicating to the first wireless device a plurality of second predetermined search space entries, each search space entry defining radio resources, and wherein the first control channel information is to be transmitted on radio resources defined by one of the plurality of second predetermined search space entries; and indicating to the second wireless device a plurality of third predetermined search space entries, each search space entry defining radio resources, and wherein the second control channel information is to be transmitted on radio resources defined by one of the plurality of third predetermined search space entries.

24. The method as claimed in claim 23, wherein the plurality of second predetermined search space entries and the plurality of third predetermined search space entries at least partially overlap, and the method comprises:

transmitting common control channel information to the first wireless device and the second wireless device using radio resources defined by search space entry in both the plurality of second predetermined search space entries and the plurality of third predetermined search space entries.

25. A first wireless device for obtaining control channel information from a base station, the wireless device comprising:

an interface; and processing circuitry configured to:

receive an indication from the base station to operate in one of a first mode and a second mode, wherein the indication is based on whether a spatial relationship between the first wireless device and a second wireless device (22) served by the base station meets a predetermined condition; and cause the first wireless device to operate in one of the first mode and the second mode based on the indication, wherein in the first mode, the first wireless device is configured to attempt to decode one or more first predetermined search space entries in order to obtain first control channel information, each search space entry defining radio resources, and wherein the first control channel information is to be transmitted on radio resources defined by one of the one or more first predetermined search space entries, and in the second mode the first wireless device is configured to attempt to decode a plurality of second predetermined search space entries in order to obtain the first control channel information, each search space entry defining radio resources, and wherein the first control channel information is to be transmitted on radio resources defined by one of the plurality of second predetermined search space entries; wherein the number of first predetermined search space entries is less than the number of second predetermined search space entries.

26. A base station for transmitting first control channel information to a first wireless device (16) and second control channel information to a second wireless device in a wireless communications network, the base station comprising:

an interface; and processing circuitry configured to:

obtain an indication of whether a spatial relationship between the first wireless device and the second wireless device meets a predetermined condition;

cause the base station to operate in one of a first mode or a second mode based on the indication; and transmit an indication to the first wireless device and the second wireless device of which of the first mode of the second mode the base station is operating in;

wherein;

in the first mode the base station is configured to transmit the first control channel information and the second control channel information using common radio resources, wherein the step of transmitting the first control channel information and the second control channel information using common radio resources comprises using spatial multiplexing of the first control channel information and the second control channel information over the common radio resources; and in the second mode the base station is configured to transmit first control channel information to the first wireless device and the second control channel information to the second wireless device using orthogonal radio resources.

* * * * *